US012792933B2

(12) United States Patent
Jing

(10) Patent No.: US 12,792,933 B2
(45) Date of Patent: Nov. 10, 2026

(54) KNOWLEDGE GRAPH ACQUISITION FRAMEWORKS AND METHODS

(71) Applicant: Purdue Research Foundation, West Lafayette, IN (US)

(72) Inventor: Xiaonan Jing, Bothell, WA (US)

(73) Assignee: Purdue Research Foundation, West Lafayette, IN (US)

( * ) Notice: Subject to any disclaimer, the term of this patent is extended or adjusted under 35 U.S.C. 154(b) by 111 days.

(21) Appl. No.: 18/372,120

(22) Filed: Sep. 24, 2023

(65) Prior Publication Data

US 2025/0013886 A1 Jan. 9, 2025

Related U.S. Application Data

(60) Provisional application No. 63/431,879, filed on Dec. 12, 2022, provisional application No. 63/409,265, filed on Sep. 23, 2022.

(51) Int. Cl.
*G06N 5/022* (2023.01)
*G06F 16/353* (2025.01)

(52) U.S. Cl.
CPC ........... *G06N 5/022* (2013.01); *G06F 16/353* (2019.01)

(58) Field of Classification Search
CPC .............................. G06F 16/353; G06N 5/022
See application file for complete search history.

(56) References Cited

U.S. PATENT DOCUMENTS 9,704,098 B2 * 7/2017 Waltinger .............. G06N 20/00
11,036,768 B2 * 6/2021 Little .................... G06F 16/258
12,106,230 B2 * 10/2024 Mihindukulasooriya .................... G06F 16/334
2016/0132572 A1 * 5/2016 Chang ..................... G06F 40/30 707/723
2021/0117509 A1 * 4/2021 Aditya .................... G06F 40/30
2022/0164683 A1 * 5/2022 Hao ...................... G06F 40/295

(Continued)

OTHER PUBLICATIONS

Coates et al., (2012). Learning feature representations with k-means. In Neural Networks: Tricks of the Trade (pp. 561-580).

(Continued)

*Primary Examiner* — David E Choi
(74) *Attorney, Agent, or Firm* — Piroozi-IP, LLC

(57) ABSTRACT

A method of generating knowledge graphs is disclosed which includes receiving a first input dataset representing unstructured sentences each having a head, a tail, and a predicate, receiving a second input dataset representing classification of heads and tails, generating a first structured database including a plurality of rows each row including a masked sentence where the sentence from the first structured database is substituted with a mask, generating prompts for the masks associated with each row in the first structured database to thereby generate a second structured database; communicating with a language model (LM) the second structured database to thereby generate and process candidate predicates, numerically representing the predicate candidates based on the associated probability numbers, clustering the numerical representation of the predicate candidates, fusing relations of the predicate candidates based on the clustering, and generating an optimized knowledge graph based on reduced repetition of candidate predicates.

16 Claims, 17 Drawing Sheets

(56) References Cited

U.S. PATENT DOCUMENTS

| | | | | |
|---|---|---|---|---|
| 2023/0136889 A1* | 5/2023 | Zopf | G06F 40/205 704/9 |
| 2023/0186030 A1* | 6/2023 | Chen | G06N 3/04 704/9 |
| 2023/0196127 A1* | 6/2023 | Zheng | G06N 3/08 706/45 |
| 2024/0013003 A1* | 1/2024 | Hoang | G06N 3/044 |
| 2025/0013886 A1* | 1/2025 | Jing | G06F 16/353 |

OTHER PUBLICATIONS

Dang et al., (2013). WordNet-based suffix tree clustering algorithm. In International Conference on Information Science and Computer Applications. ISCA.
De Marneffe et al., (May 2006). Generating typed dependency parses from phrase structure parses. In Proceedings of LREC (pp. 449-454).
Del Pozo et al., (2008). Defining functional distances over gene ontology. BMC Bioinformatics, 9(1), 1.
Devlin et al., (2019). BERT: Pre-training of deep bidirectional transformers for language understanding. In Proceedings of NAACL-HLT (pp. 4171-4186).
Dijstra (1959). A note on two problems in connexion with graphs. Numerische Mathematik, 1(1), 269-271.
Dong (2014). From data fusion to knowledge fusion. Proceedings of the VLDB Endowment, 7(10), 881-892.
Dunn (1973). A fuzzy relative of the ISODATA process and its use in detecting compact well-separated clusters. Journal of Cybernetics, 3(3), 32-57.
Dyer et al., (2015). Transition-based dependency parsing with stack long short-term memory. arXiv preprint arXiv: 1505.08075.
Finkel et al., (2005, June). Incorporating non-local information into information extraction systems by Gibbs sampling. In Proceedings of the 43rd Annual Meeting on Association for Computational Linguistics (pp. 363-370).
Fodeh et al., (2009). Combining statistics and semantics via ensemble model for document clustering. In Proceedings of the 2009 ACM Symposium on Applied Computing (pp. 1446-1450).
Forbus et al., (2017). Analogy and relational representations in the companion cognitive architecture. Al Magazine.
Forsati et al., (2013). Efficient stochastic algorithms for document clustering. Information Sciences, 220, 269-291.
Foster et al., (2011). From news to comment: Resources and benchmarks for parsing the language of web 2.0. In Proceedings of the 5th International Joint Conference on Natural Language Processing (pp. 893-901).
Ghosa et al., (2020). Kingdom: Knowledge-guided domain adaptation for sentiment analysis. In Proceedings of the 58th Annual Meeting of the Association for Computational Linguistics (pp. 3198-3210).
Ghosh et al., (2013). Comparative analysis of k-means and fuzzy c-means algorithms. IJACSA) International Journal of Advanced Computer Science and Applications, 4(4), 35-39.
Haji et al., (Jun. 2009). The CoNLL-2009 shared task: Syntactic and semantic dependencies in multiple languages. In Proceedings of the Thirteenth Conference on Computational Natural Language Learning: Shared Task (pp. 1-18).
Han et al., (2019). OpenNRE: An open and extensible toolkit for neural relation extraction. In EMNLP-IJCNLP 2019 (p. 169).
Hassanpour et al., (2014). Clustering rule bases using ontology-based similarity measures. Web Semantics: Science, Services and Agents on the World Wide Web, 25, 1-8.
Bouras, C., & Tsogkas, V. (2012). A clustering technique for news articles using WordNet. Knowledge-Based Systems, 36, 115-128.
Kannan, K., Goyal, M., & Jacob, G. T. (2013). Modeling the impact of review dynamics on utility value of a product. Social Network Analysis and Mining, 3(3), 401-418.
Leacock, C., & Chodorow, M. (1998). Combining local context and WordNet similarity for word sense identification. WordNet: An Electronic Lexical Database, 49(2), 265-283.
Thorndike, R. L. (1953, December). Who belong in the family? Psychometrika, 18(4), 267-276.
Trisedya et al., (2019). Entity alignment between knowledge graphs using attribute embeddings. In Proceedings of the AAAI Conference on Artificial Intelligence (vol. 33, pp. 297-304).
Vaswani et al., (2017). Attention is all you need. Advances in Neural Information Processing Systems, 30.
Wang et al., (Aug. 2011). Latent aspect rating analysis without aspect keyword supervision. In Proceedings of the 17th ACM SIGKDD International Conference on Knowledge Discovery and Data Mining (pp. 618-626).
Wei et al., (2015). A semantic approach for text clustering using WordNet and lexical chains. Expert Systems with Applications, 42(4), 2264-2275.
Weiss et al., (2015). Structured training for neural network transition-based parsing. arXiv preprint arXiv: 1506.06158.
Wu et al., (2020). Scalable zero-shot entity linking with dense entity retrieval. In Proceedings of the 2020 Conference on Empirical Methods in Natural Language Processing (EMNLP) (pp. 6397-6407).
Wu et al., (2013). Improving the measurement of semantic similarity between gene ontology terms and gene products: Insights from an edge- and IC-based hybrid method. PLoS One, 8(5), e66745.
Wu et al., (1994). Verbs semantics and lexical selection. In Proceedings of the 32nd Annual Meeting on Association for Computational Linguistics (pp. 133-138).
Xue et al., (2005). The Penn Chinese TreeBank: Phrase structure annotation of a large corpus. Natural Language Engineering, 11(02), 207-238.
Yang et al., (2012). Improving GO semantic similarity measures by exploring the ontology beneath the terms and modelling uncertainty. Bioinformatics, 28(10), 1383-1389.
Zhang et al., (2018). Variational reasoning for question answering with knowledge graph. In 32nd AAAI Conference on Artificial Intelligence.
Zamir et al., (1998). Web document clustering: A feasibility demonstration. In Proceedings of the 21st Annual International ACM SIGIR Conference on Research and Development in Information Retrieval (pp. 46-54).
McDonald et al., (Jun. 2006). Multilingual dependency analysis with a two-stage discriminative parser. In Proceedings of the Tenth Conference on Computational Natural Language Learning (pp. 216-220).
Medhat et al., (2014). Sentiment analysis algorithms and applications: A survey. Ain Shams Engineering Journal, 5 (4), 1093-1113.
Meng et al., (2013). A review of semantic similarity measures in WordNet. International Journal of Hybrid Information Technology, 6(1), 1-12.
Mishra et al., (2017). Domain-targeted, high precision knowledge extraction. Transactions of the Association for Computational Linguistics, 5, 233-246.
Miller (1995). WordNet: A lexical database for English. Communications of the ACM, 38(11), 39-41.
Mudinas et al., (Aug. 2012). Combining lexicon and learning based approaches for concept-level sentiment analysis. In Proceedings of the First International Workshop on Issues of Sentiment Discovery and Opinion Mining (ACM) (pp. 5:1-5:8).
Nair et al., (2010). Rectified linear units improve restricted Boltzmann machines. In Proceedings of the 27th ICML (pp. 807-814).
Navigli (2009). Word sense disambiguation: A survey. ACM Computing Surveys (CSUR), 41(2), 10.
Nielsen (2011). A new ANEW: Evaluation of a word list for sentiment analysis in microblogs. arXiv preprint arXiv:1103.2903.
Nivre et al., (May 2006). MaltParser: A data-driven parser-generator for dependency parsing. In Proceedings of LREC (pp. 2216-2219).
Pang et al., (May 2006). Seeing stars: Exploiting class relationships for sentiment categorization with respect to rating scales. In Proceedings of the 43rd Annual Meeting on Association for Computational Linguistics (pp. 115-124).

(56) References Cited

OTHER PUBLICATIONS

Pang et al., (2008). Opinion mining and sentiment analysis. Foundations and Trends in Information Retrieval, 2(1-2), 1-135.
Peng et al., (2015). Measuring semantic similarities by combining gene ontology annotations and gene co-function networks. BMC Bioinformatics, 16(1), 1.
Petrov et al., (2012). Overview of the 2012 shared task on parsing the web. In the First Workshop on Syntactic Analysis of Non-Canonical Language.
Qin et al., (2020). Generative adversarial zero-shot relational learning for knowledge graphs. In Proceedings of the AAAI Conference on Artificial Intelligence.
Resnik (1995). Using information content to evaluate semantic similarity in a taxonomy. arXiv preprint cmp-lg/9511007.
Snyder et al., (Apr. 2007). Multiple aspect ranking using the good grief algorithm. In Proceedings of HLT-NAACL (pp. 300-307).
Socher et al., (Oct. 2013). Recursive deep models for semantic compositionality over a sentiment treebank. In Proceedings of the conference on empirical methods in natural language processing (pp. 1631-1642).
Toutanova et al., (May 2003). Feature-rich part-of-speech tagging with a cyclic dependency network. In Proceedings of the 2003 Conference of the North American Chapter of the Association for Computational Linguistics on Human Language Technology (pp. 173-180).
Agarwal et al., (2015). Concept-level sentiment analysis with dependency-based semantic parsing: A novel approach. Cognitive Computation, 7(4), 487-499.
Al-Mubaid et al., (2006). A cluster-based approach for semantic similarity in the biomedical domain. In Proceedings of the 28th Annual International Conference of the IEEE Engineering in Medicine and Biology Society (pp. 2713-2717).
Andor et al., (2016). Globally normalized transition-based neural networks. arXiv preprint arXiv: 1603.06042.
Andrews et al., (2007). Recent developments in document clustering. Technical Report, Computer Science, Virginia Tech.
Arthur et al., (2007). k-means++: The advantages of careful seeding. In Proceedings of the eighteenth annual ACM-SIAM symposium on Discrete algorithms (pp. 1027-1035).
Ayoola et al., (2022). Refined: An efficient zero-shot-capable approach to end-to-end entity linking. In NAACL 2022.
Baker (2012). FrameNet, current collaborations and future goals. Language Resources and Evaluation, 46(2), 269-286.
Ballesteros et al., (2015). Improved transition-based parsing by modeling characters instead of words with LSTMs. arXiv preprint arXiv:1508.00657.
Batet et al., (2011). An ontology-based measure to compute semantic similarity in biomedicine. Journal of Biomedical Informatics, 44(1), 118-125.
Bhakthavatsalam et al., (2020). Generic-SKB: A knowledge base of generic statements. arXiv preprint arXiv:2005.00660.
Blitzer et al., (Jun. 2007). Biographies, bollywood, boom-boxes and blenders: Domain adaptation for sentiment classification. In Proceedings of the 45th Annual Meeting of the Association for Computational Linguistics (pp. 432-439).
Bollacker et al., (2008). Freebase: A collaboratively created graph database for structuring human knowledge. In Proceedings of the 2008 ACM SIGMOD international conference on Management of data (pp. 1247-1250).
Cai et al., (Aug. 2013). Multi-view K-means clustering on big data. In Proceedings of the 23rd International Joint Conference on Artificial Intelligence (IJCAI) (pp. 2598-2604).
Caniza et al., (2014). GOssTo: A stand-alone application and a web tool for calculating semantic similarities on the Gene Ontology. Bioinformatics, 30(15), 2235-2236.
Cataldi et al., (2013). Good location, terrible food: Detecting feature sentiment in user-generated reviews. Social Network Analysis and Mining, 3(4), 1149-1163.
Chen et al., (Jul. 2014). Inferring topic-dependent influence roles of Twitter users. In Proceedings of the 37th International ACM SIGIR Conference on Research & Development in Information Retrieval (pp. 1203-1206).
Chen et al., (2011). An integration of fuzzy association rules and WordNet for document clustering. Knowledge and Information Systems, 28(3), 687-708.
Chen et al., (Oct. 2014). A fast and accurate dependency parser using neural networks. In EMNLP (pp. 740-750).
Chen et al., (2022). KnowPrompt: Knowledge-aware prompt-tuning with synergistic optimization for relation extraction. In Proceedings of the ACM Web Conference 2022 (pp. 2778-2788).
Hotho et al., (2003). Ontologies improve text document clustering. In Proceedings of the International Conference on Data Mining. ICDM 2003 (pp. 541-544).
Hovy et al., (Jun. 2006). OntoNotes: The 90% solution. In Proceedings of the human language technology conference of the NAACL, Companion Volume: Short Papers (pp. 57-60).
Hu et al., (Aug. 2004). Mining and summarizing customer reviews. In Proceedings of the tenth ACM SIGKDD international conference on Knowledge discovery and data mining (pp. 168-177).
Jiang et al., (1997). Semantic similarity based on corpus statistics and lexical taxonomy. arXiv preprint cmp-lg/9709008.
Johansson et al., (2007). Extended constituent-to-dependency conversion for English. In Proceedings of the 16th Nordic Conference of Computational Linguistics (pp. 105-112).
Judge et al., (Jul. 2006). Questionbank: Creating a corpus of parse-annotated questions. In Proceedings of the 21st International Conference on Computational Linguistics and the 44th annual meeting of the Association for Computational Linguistics (pp. 497-504).
Kolluru et al., (2020). OpenIE6: Iterative grid labeling and coordination analysis for open information extraction. In Proceedings of the 2020 Conference on Empirical Methods in Natural Language Processing (EMNLP) (pp. 3748-3761).
Kong et al., (2014). A dependency parser for tweets. In Proceedings of the Conference on Empirical Methods in Natural Language Processing (pp. 1001-1012).
Zhong (Jul. 2005). Efficient online spherical k-means clustering. In Proceedings of 2005 IEEE International Joint Conference on Neural Networks (pp. 3180-3185).
Lin (1998). An information-theoretic definition of similarity. In ICML 98 (pp. 296-304).
Liu et al., (2019). RoBERTa: A robustly optimized BERT pretraining approach. arXiv preprint arXiv: 1907.11692.
Liu et al., (2018). Entity-duet neural ranking: Understanding the role of knowledge graph semantics in neural information retrieval. In Proceedings of the 56th Annual Meeting of the Association for Computational Linguistics.
Logeswaran et al., (2019). Zero-shot entity linking by reading entity descriptions. In Proceedings of the 57th Annual Meeting of the Association for Computational Linguistics (pp. 3449-3460).
MacQueen (1967). Some methods for classification and analysis of multivariable observations. In Proceedings of the Fifth Berkeley Symposium on Mathematical Statistics and Probability (vol. 1, No. 14, pp. 281-297).
Manning et al., (2014). The Stanford CoreNLP natural language processing toolkit. In Proceedings of 52nd annual meeting of the association for computational linguistics: system demonstrations (pp. 55-60).
Martins et al., (2013). Turning on the turbo: Fast third-order non-projective turbo parsers. In Proceedings of the 51st Annual Meeting of the Association for Computational Linguistics.
Martins et al., (Aug. 2014). Priberam: A turbo semantic parser with second order features. In Proceedings of the 8th International Workshop on Semantic Evaluation, SemEval 2014 (pp. 471-476).
Martins et al., (Aug. 2009). Concise integer linear programming formulations for dependency parsing. In Proceedings of the Joint Conference of the 47th Annual Meeting of the ACL and the 4th International Joint Conference on Natural Language Processing of the AFNLP (vol. 1, No. 1, pp. 342-350).

(56) References Cited

OTHER PUBLICATIONS

Martins et al., (Aug. 2010). Turbo parsers: Dependency parsing by approximate variational inference. In Proceedings of the 2010 Conference on Empirical Methods in Natural Language Processing (pp. 34-44).

* cited by examiner

Input

| Unstructured Sentences (About Animals) |
| --- |
| -"Most cats require high proteins." |
| -"Cats consume proteins to live." |
| -"Some cats consume fish as the source of proteins." |
| -"Some cats eat fish." |
| -"Some cats love eating fish." |
| -"Fish living in rivers can be food for wild cats." |
| -"Cats have paws." |
| -"A kitten is a baby cat." |
| -"Kittens grow up to be cats." |
| -"Kittens are cats that are less then 6 months old." |
| -"Kittens need a large amount of protein to grow up." |
| -"Kittens require proteins." |
| -"Kitten has smaller paws than adult cats." |

Data source 1
(What computer sees):
unstructured sentences

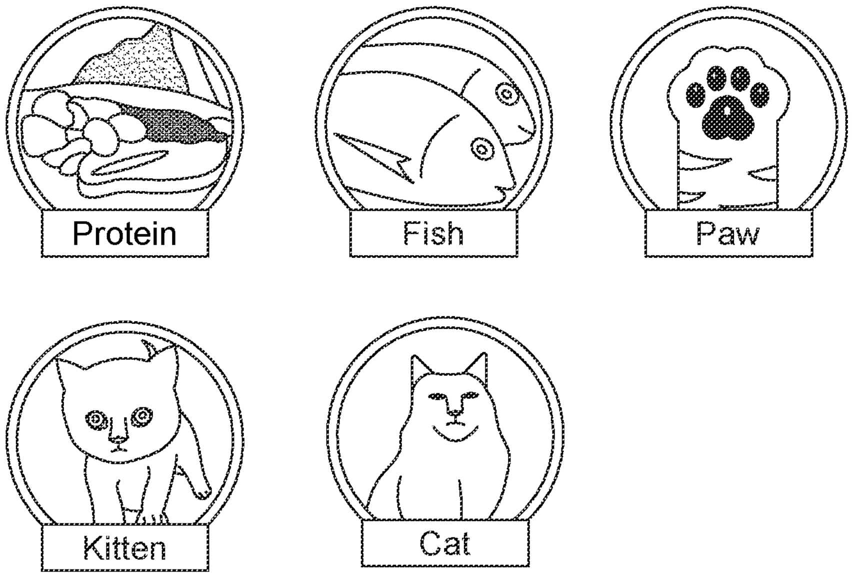

Data source 2
(What computer knows):
objects of the world

FIG. 2

From FIG. 3a

KNOWLEDGE GRAPH ACQUISITION FRAMEWORKS AND METHODS

CROSS-REFERENCE TO RELATED APPLICATIONS

The present non-provisional patent application is related to and claims the priority benefit of U.S. Provisional Patent Application Ser. No. 63/409,265, filed Sep. 23, 2022 and of U.S. Provisional Patent Application Ser. No. 63/431,879, filed Dec. 12, 2022, the contents of each which are hereby incorporated by reference in its entirety into the present disclosure.

STATEMENT REGARDING GOVERNMENT FUNDING

None.

TECHNICAL FIELD

The present disclosure generally relates to knowledge graphs and in particular to prompt-assisted relation fusion in knowledge graph acquisition.

BACKGROUND

This section introduces aspects that may help facilitate a better understanding of the disclosure. Accordingly, these statements are to be read in this light and are not to be understood as admissions about what is or is not prior art.

Language has enabled mankind to communicate between members of communities and to pass knowledge from one generation to another allowing accumulation of our understanding of the world. Description of the world and the items in it requires a generalized code to represent the formalization of the knowledge. The representation can take various forms—it does not limit to a certain language, however, should reserve the ability to be translated from one to another.

It should be understood that the term language does not only imply the natural language of human's daily speech, but also a formalized encoding of rules. Such formalization has been explored as the knowledge base (KB) systems in computer linguistics and ontology. In more recent works, researchers have focused on a form of KB systems called "Knowledge Graph" (KG). In many literature, the term "ontology" and "knowledge graph" have been used interchangeably to describe an expert system in which knowledge instances reside. Sometimes, the term "knowledge base" is used directly to describe any systems constructed for the goal of formalizing world knowledge.

Knowledge base systems have been studied for decades starting in the 1970s. Various approaches have been explored in acquiring accurate and scalable KBs. One of the persisting challenge in KB acquisition lies in the coverage of the knowledge instances. Additionally, knowledge is not static, the instances contained in a KB can emerge, evolve, deteriorate, and disappear over time. Even in contemporary research where a data driven approach has become the mainstream, KG acquisition still suffers from incompleteness, in both the scale dimension and the time dimension. To overcome this challenge, Knowledge Graph Completion (KGC), as a part of KG acquisition, has emerged. The assumption is that by imitating human's ability, unseen knowledge can be acquired from existing knowledge items when certain properties were understood. Researchers believe that by utilizing modern neural networks (NNs), inferences can be made from existing knowledge items in a well-constructed KB. The inference or prediction can be made by learning structural and semantic relationships of the existing KB. To be computationally efficient, many studies focus on KG which uses a simple triple representation. A triple representation includes a head entity, a predicate and a tail entity. The head entity and the tail entity are connected by the predicate which indicates a certain relation between them. General KG acquisition task tries to construct a graph from a corpus in which each instance is a triple. KGC, on the other hand, attempts to infer the missing entities or relationships in knowledge graphs and mining unknown facts to acquire more triple representations to an existing graph.

However, a few challenges can be identified in KG acquisition. To acquire KG from real world data, triple representations needed to be first identified from sentences that are provided as input to a linguistic system. Several subsystems have been implemented. First, a relation extraction (RE) subsystem aims to resolve specifically the problem of extracting relational predicate from input text. Next, similar head and tail entities were mapped together to form a single source of data entry to avoid duplicates in the KG. The entity linking tasks tackle this challenge by associating the same entities together, often through the entity description and metadata. Finally, determining whether the new triple can be added to the KG needs to be decided through knowledge fusion; which integrates heterogeneous sources into one. The above tasks made it possible to acquire knowledge triples from real world data corpora. However, limitations persist. For an optimum KG corpus, there exist a finite number of entities and relation types. Yet, for a real world dataset, the triples can cover a very wide range of entities and relations without being formalized.

A significant challenge in knowledge fusion within KG acquisition is how to determine whether relations extracted from different data sources can be merged together. Without the ability to merge these relations extracted from different data sources, KGs can become inefficient and unnecessarily large with similar relations treated differently.

Specifically, in a KG a set of lexicons with identical meanings and properties forms a collection or a concept. Adding raw relations without fusing with existing ones will introduce redundancies to the KG in the form of 1) multiple relation edges of identical meaning are treated as irrelevant relations; and 2) repeating knowledge instances where two relation edges connect the same end entities but represent identical relations.

Therefore, there is an unmet need for a novel methodology to identify relations extracted from different data sources and merge these relations as related in a knowledge graph.

SUMMARY

A method of generating knowledge graphs is disclosed, The method includes receiving a first input dataset representing unstructured sentences, wherein the unstructured sentences include unstructured triples, wherein each triple includes a head entity, a predicate, and a tail entity. The method further includes receiving a second input dataset representing classification of head and tail entities. For each unstructured sentence received from the first input dataset the method further includes applying a toolkit to thereby identify dependency between each word of said each unstructured sentence and one or more words in said each unstructured sentence, wherein the toolkit provides part of speech tags for each word in said each unstructured sentence; annotating said each unstructured sentence by identifying the corresponding head entity, tail entity, and predicate; and pre-processing the first and the second input datasets to thereby generate a first structured database including a plurality of rows wherein each row includes a plurality of parameters, number of rows in the first structured database is based on number of unstructured sentences obtained from the first input dataset which have corresponding head and tail entities in the second input dataset based on the identified corresponding head and tail entities, wherein the first structured database includes masked sentences, whereby each identified predicate is substituted by a mask. Additionally, the method includes generating prompts for the masks associated with each row in the first structured database to thereby generate a second structured database, communicating with a language model (LM) the second structured database to thereby generate and process candidate predicates associated with each prompt for each sentence from the second structured database, each candidate predicate accompanied with an associated probability number of accuracy, numerically representing the predicate candidates based on the associated probability numbers, clustering the numerical representation of the predicate candidates, fusing relations of the predicate candidates based on the clustering; and generating an optimized knowledge graph based on reduced repetition of candidate predicates.

BRIEF DESCRIPTION OF FIGURES

FIG. 2 is an example of input to a pre-processing block shown in FIG. 1*b* provided in an example form.

DETAILED DESCRIPTION

Figure 1A:
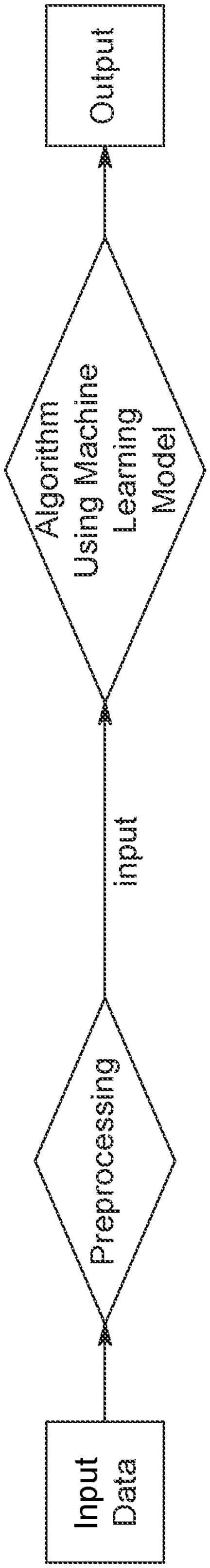
FIG. 1*a* is a schematic of an algorithm which is the basis of a software housed on a non-transient memory and which is executed by a processor.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel methodology is disclosed herein to identify relations extracted from different data sources and merge these relations as related relations in a knowledge graph (KG). Towards this end, the present disclosure provides a prompt-based learning method for a relation fusion process.

Perhaps the best known application of KG is information retrieval. KG acquisition task involves many aspects such as relation extraction, entity linking, and relation fusion. Starting in the 1990s, researchers have been working on constructing open source knowledge bases (KBs) with a hope to store structured knowledge on computer systems. The early works in KB systems focused on defining the semantic components of the entities, which includes defining senses, usage cases, and rules. As the early KB systems were constructed for various purposes, no common template were followed during the creation processes. However, the core of these KBs followed the idea of connecting the concepts with relationships in some forms.

With the Web Ontology Language (OWL) becoming widely used in KR, many newly created KBs adopted the OWL standards to describe the KBs. An OWL ontology is represented in a Resource Description Framework (RDF) graph which includes RDF triples. Each triple contains a subject, a predicate, and an object which form a node-edge-node link. A triple (h, r, t) defines a relationship r going from the head entity h to the tail entity t, while h and t corresponds to the subject and object, and r corresponds to the predicate.

In recent years, KGs have been widely adopted in natural language processing (NLP) research. The shared characteristics of KG datasets in NLP research typically defines the data to be stored in a particular graph structure, which instances are known as KG triples. The head and the tail of a triple (h, r, t) can be viewed as instances which represent real entities of the world, and the relationship often represents a type of semantic connection between the entities.

A KG may include thousands of triples which encode relationship of real world entities. Such a graph data structure allows a variety of information to be stored and linked to model real world facts. To use such graphs in computation for downstream NLP tasks, a general approach is to "embed" the graph while preserving the original relationship into vector spaces. This process is called embedding learning. The embedding learning idea in NLP tasks first came from statistical language modeling where "a distributed representation" for each word is learned. Some in the prior art borrowed the word embedding idea to define the embedding for graph based knowledge base systems as the embedding of nodes and their edges in the same vector space. Assume a KG is well defined, a good set of embeddings should encode the information such that the "head", "relationship", and "tail" triple still hold when represented in vector forms.

Knowledge graph completion (KGC) aims to solve the missing link problem between knowledge instances in a KG. KGs, despite constructed manually or (semi-)automated often suffer from limited coverage of information. Compared to automatically populated KGs, manually constructed KGs by domain experts are more accurate, however, very limited in size, due to the high costs of training experts. Automatically populated KGs, on the other hand, can contain a large amount of knowledge entries, but are often less accurate. Furthermore, the entity types contained in those KGs are often restricted to named entities or proper nouns, which exists in external sources such as Wikipedia® or can be extracted easily by natural language parser. To overcome the coverage limitation of the existing KGs, various approaches have been proposed to expand the existing KG by integrating new instances.

Different from KGC relying on learning from existing KG to predict new instances, KGC in an open-world setting requires an additional layer of integration. In the case of knowledge fusion, information extraction (IE) serves as an initial step to filter knowledge source requires the candidate entities and relations to be extracted from unstructured textual data. Many OpenIE systems have presented statistical approaches to extract fact triples. To incorporate the new knowledge facts into existing KG in a consistent manner, several challenges need to be addressed. These challenges can come from different stages of the task. First, errors can come from the triples identified by RE systems. Second, redundancy can be resulted from incorrect entity and predicate linkage. Third, a calibration is required over the trustworthiness of the extracted triples. Fourth, how can the quality of the knowledge fusion result be evaluated.

In a prompt-based model, a prompt should be designed using existing input text, often sentences, along with some additional information that can trigger language models (LMs) to make high probabilistic predictions. A formal prompting terminology and notation can be defined as shown in Table 1.

TABLE 1

Terminology and notation of prompt-based learning

| Name | Notation | Example | Description |
|---|---|---|---|
| Input | x | I love this movie. | One or multiple texts |
| Output | y | ++(very positive) | Output label or text |
| Prompting Function | $f_{prompt}(x)$ | [X] Overall, it was a [Z] movie. | A function that converts the input into a specific form by inserting the input x and adding a slot [Z] where answer z may be filled later. |
| Prompt | x' | I love this movie. Overall, it was a [Z] movie. | A text where [X] is instantiated by input x but answer slot [Z] is not. |
| Filled Prompt | $f_{fill}(x', z)$ | I love this movie. Overall, it was a bad movie. | A prompt where slot [Z] is filled with any answer. |
| Answered Prompt | $f_{fill}(x', z^*)$ | I love this movie. Overall, it was a good movie. | A prompt where slot [Z] is filled with a true answer. |
| Answer | z | "good", "fantastic", "boring" | A token, phrase, or sentence that fills [Z] |

z* represents answers that correspond to true output y* in P

Given the input sentences $X=\{x_1, x_2, \ldots, x_n\}$, a Prompting Function $f_{prompt}(X)$ maps X through a template to the corresponding Prompts X'. The template contains an empty answer slot z which allows the LMs to fill K answers and generates the answer space $Z=\{z_1, z_2, \ldots, z_n\}$ based on the contexts of the prompt accordingly. A Filled Prompt is when z is filled with an answer, and an Answered Prompt is when z is filled with the true answer when the labels are available.

Under the LM environment, the empty slots in the prompt should be replaced with a masked token "[MASK]". When feeding the masked sentences through the LMs, the model will perform a "mask-filling" task to output a series of candidates which best fill the slot of the masked token. The probability, or confidence score of the predictions can be used to rank the predicated candidates.

With the same input sentence, various prompt design can result in different prediction results. Given an input example sentence X="I missed the bus today.", two prompts are generated for predicting a sentiment word of X. Prompting function 1 $f_{prompt1}(x)$ maps X to "X. I felt so [MASK].", and prompting function 2 $f_{prompt2}(x)$ maps X to "X. What a [MASK] day." Table 2 illustrates the top 5 prediction results on both prompts with a pretrained model. Both of the prediction candidates are negative sentiment words. However, the candidates and ordering are hardly identical. This is because Prompt 1 emphasize how the event X effects on the feeling of a person, while Prompt 2 tries to describe the effect of the event X to the period of time. Although most of the candidate predictions are interchangeable between the two prompts, it is clear that the subject of the prompt can affect the output self-attention scores and subsequently cause a change in the answer space.

TABLE 2

Example predictions using a pretrained model on two different prompt designs over the same input sentence X "I missed the bus today."

| | | | |
|---|---|---|---|
| I missed the bus today. | | I missed the bus today. | |
| I felt so <mask> | | What a <mask> day. | |
| Compute | | Compute | |
| Computation time on cpu: 0.188 s | | Computation time on cpu: 0.166 s | |
| bad | 0.169 | sad | 0.106 |
| stupid | 0.115 | long | 0.069 |
| guilty | 0.078 | horrible | 0.059 |
| sad | 0.052 | terrible | 0.053 |
| alone | 0.047 | bad | 0.051 |
| (a) Prompt 1—"X. I felt so <mask> | | (b) Prompt 2—"X. What a <mask> day. | |

The present disclosure provides a methodology to apply prompt-based learning to assist with relation fusion in a real world knowledge acquisition task. More specifically, given text triples extracted from the corpus, prompts are generated so that the LMs can be used to output pools of candidates which can represent the predicates of the triples. The predicate representations are then used in relation fusion to determine if the predicates are form the same relation or not. Thus, the method of the present disclosure generates conceptualized relations in an unsupervised manner directly from text corpus.

A framework of the methodology according to the present disclosure is shown in FIG. 1*a* which is a schematic of an algorithm which is the basis of a software housed on a non-transient memory and which is executed by a processor. Input data in the form of text corpus is provided as input data and via prompting is preprocessed and provided to an algorithm using machine learning model producing a prompt assisted output. From another perspective, three main modules, 1) pre-processing, 2) prompting, 3) relation fusion, are involved in the methodology of prompt-based learning in relation fusion, as shown in FIG. 1*b* which is a schematic showing the building blocks of the methodology of the present disclosure.

Figure 1B:
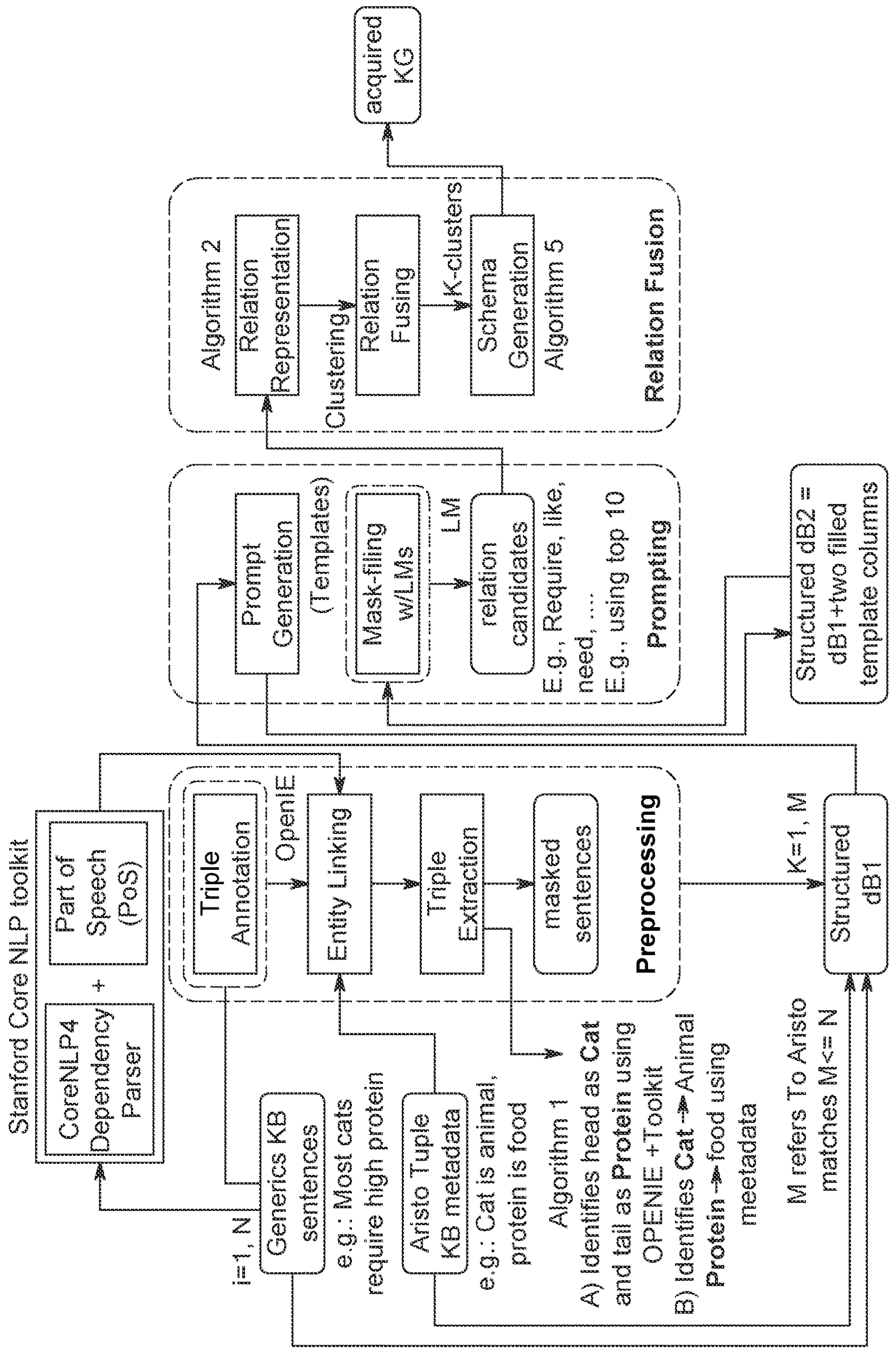
FIG. 1*b* is a schematic showing the building blocks of the methodology of the present disclosure.

As shown in FIG. 1*b*, the generic KB sentences from a repository (e.g., a database) is provided as input. The first step is to perform a triple annotation from these input sentences. The triples and their format are discussed above. These annotated triples are then provided to an entity linking block to align the three parts of the triples. The output of the entity linking is provided to triple extraction block to thereby generate individual triples. The entity linking block also receives input from a KG metadata (e.g., Aristo KG metadata, known to a person having ordinary skill in the art) which are designed to describe data holdings databases and associated structural metadata. The output of the triple extraction block is provided to a block called masked sentences that is configured to generate the masks as discussed above. The output of the masked sentences block along with the KG metadata are then provided to a prompt generation block.

Figure 1C:
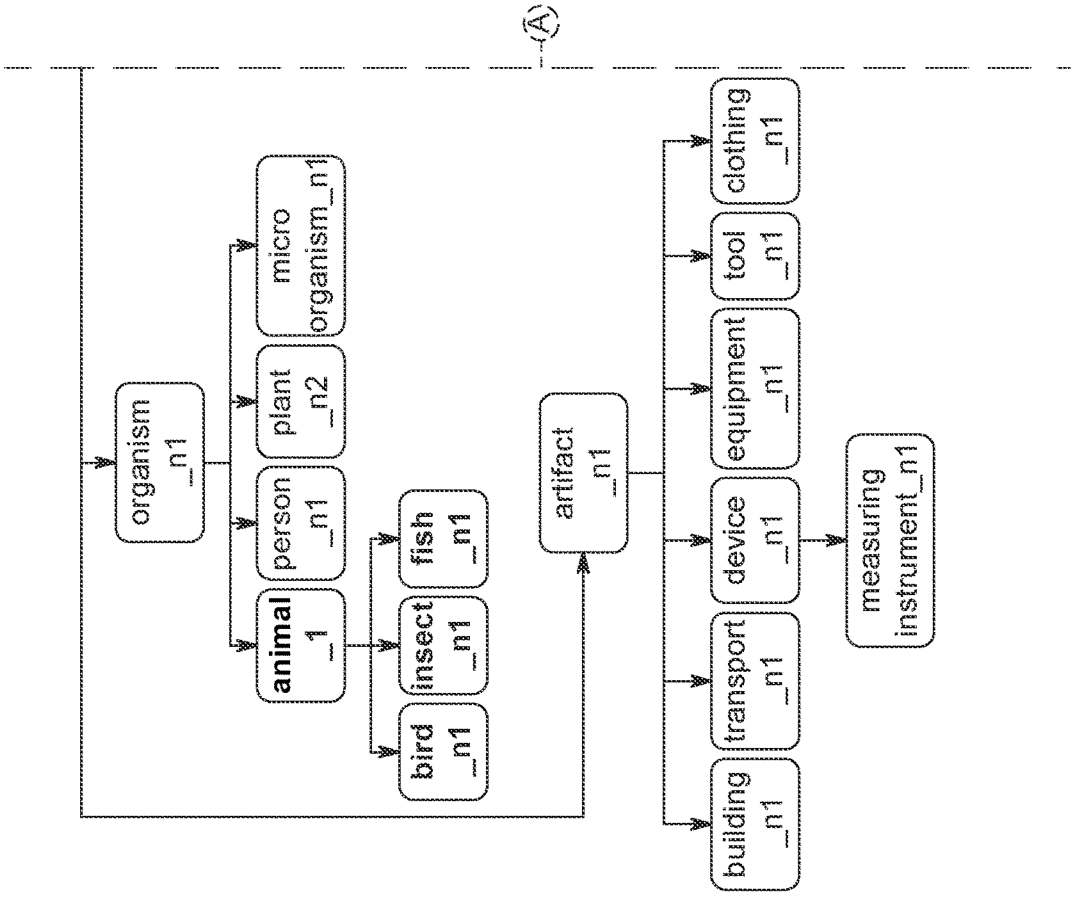
FIG. 1*c* is a schematic of 50 WordNet type entity class hierarchy in Aristo Tuple KB, which is a building block of FIG. 1*b*.
Figure 1C:
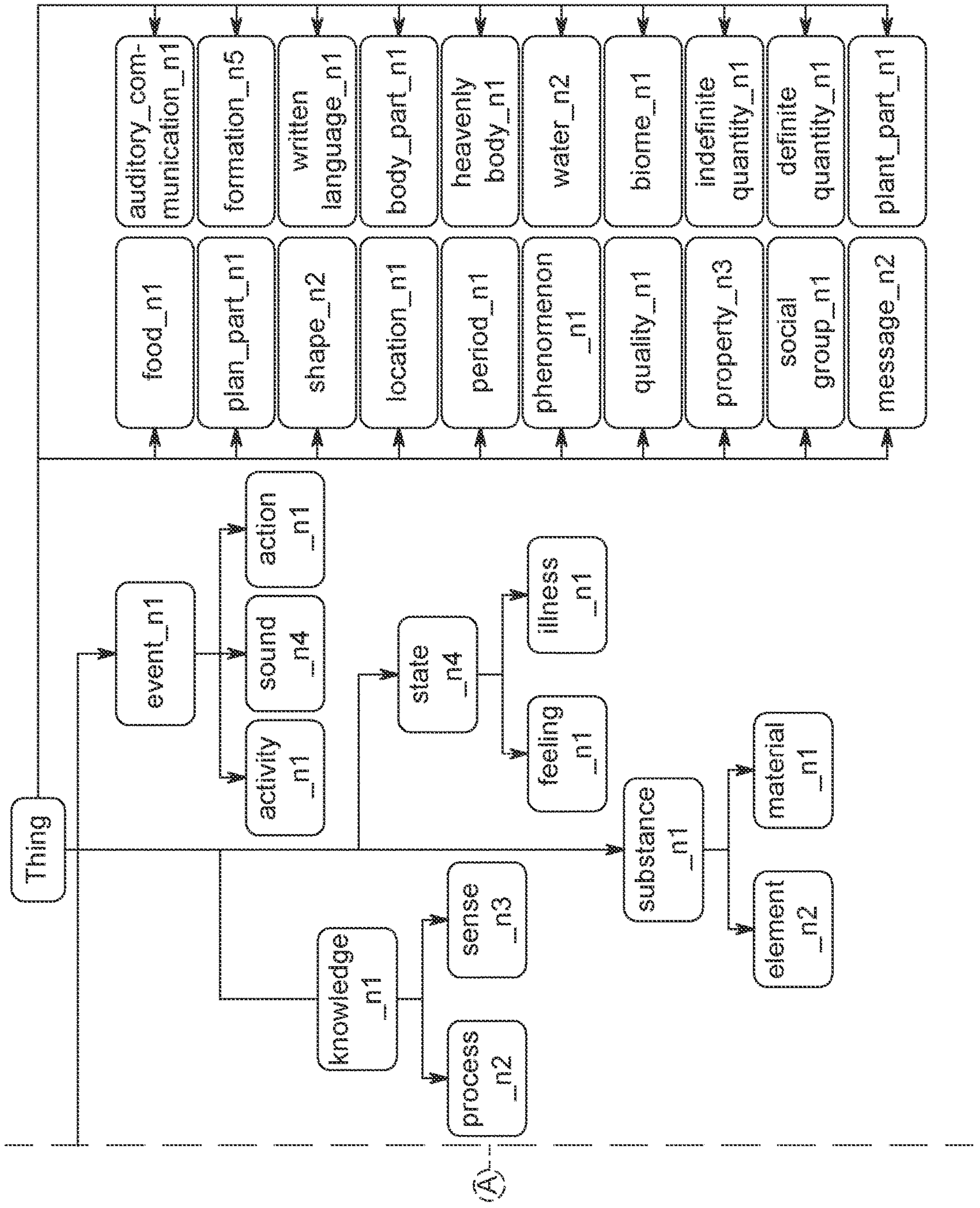

Two open source datasets were utilized in the implementation of the present disclosure. The main dataset used for KG acquisition is the GenericsKB dataset (BHAKTHAVATSALAM, ANASTASIADES, AND CLARK 2020), from which sentences are used to extract KG triples. An assistant dataset, the Aristo Tuple KB (MISHRA et al., 2017) is applied to limit the scope of the experiments and supply the metadata information needed for prompt generation. The Aristo Tuple KB metadata contains knowledge triples and their metadata constructed from elementary science domain corpus. There are 49 WordNet type entity classes and an additional type "Thing" within the Aristo Tuple KB. The entity classes hold hierarchical structures (FIG. 1*c*, which provides a schematic of 50 WordNet type entity class hierarchy in Aristo Tuple KB) with "Thing" being the highest level in the hierarchy. Each entity class corresponds to a WordNet synset and each unique entity belongs to an entity class. A total of 6,465 unique entities are identified. While most of the entities belong to a unique class, 15 entities belong to more than one classes that are not the class 'Thing'. Additionally, each entity consists only of a single token or a dash connected multi-tokens which can be treated as a single word. The entity and entity class mapping is verified manually by the authors Mishra et al. (2017) through a part-of-speech based WordNet synset mapping. To further reduce the memory costs for model execution and complexities for relation fusion evaluation, the subsequent experiments focus on a subset which consists of animal entity classes (the shaded entity classes as illustrated in FIG. 1*c*). The Aristo Animal Subset identified 395 unique entities in the class "animal n1", 92 entities in "bird n1", 47 entities in "insect n1", and 37 entities in "fish n1". These entities are used for filtering animal related triples from GenericsKB sentences.

As shown in FIG. 1*b*, GenericsKB (BHAKTHAVATSALAM et al. 2020) is an input database which is a collection of generic statements built from several data archives and labeled through crowd-workers. The data sources include: Waterloo corpus (CLARK et al., 2016), which is a large plain text corpus of 280 GB in size gathered from the .edu domains, which consists of filtered SIMPLEWIKIPEDIA pages that are written in shorter sentences and easier grammar as compared to the original WIKIPEDIA®; and ARC corpus (CLARK et al., 2018), which contains 14 million sciences and general sentences. Thus, Generic KB is a large database (dB) which is used as input to the system of the present disclosure, with N sentences. The crowd-workers were asked to evaluate whether the sentences are "useful, general truth" and to reject several type of sentences. The rejection criteria and example sentences are as the following: 1) Sentences which do not stand on their own, e.g., "Free parking is provided." 2) Subjective and/or not useful statements, e.g., "Life is too serious, sometimes." 3) Vague statements, e.g., "All cats are essentially cats." 4) Statements about people and companies, e.g., "APPLE© makes lots of IPHONES®." 5) Facts that are incorrect in isolation, e.g., "All maps are hand-drawn." A labeled subset of 3.4 million sentences was used to train and apply a BERT classifier to classify the rest of the unlabeled sentences. The resulting Generic KB sentences dataset contains 3,433,000 sentences (i.e., N=3,433,000). The main entity described in each generic sentence is labeled in the dataset, and there are multiple sentences under the same entity describing different facts. Table 3 shows an example entry of an entity "tree", its related generics sentences and their metadata encoded in GenericsKB. A preliminary inspection shows that the metadata from Aristo Animal Subset, specifically the entities and their classes, can be used to supply additional information for animal related subjects in GenericsKB as both of the datasets lie within the general science domain. It is worth noting that the original sentences used for constructing Aristo Tuple KB are not openly accessible during the time when the experiments are conducted. Thus, GenericsKB which is a dataset in similar domain is adopted in the present disclosure. The limitation in dataset also resulted in a difficulty in evaluating the final result there does not exist a comparison group in assessing the quality of the relation fusion methods.

TABLE 3

| An example entry "tree" in GenericsKB |
| --- |
| 1. Example generics about "tree" in GENERICSKB |
| Trees are perennial plants that have long woody trunks. |
| Trees are woody plants which continue growing until they die. |
| Most trees add one new ring for each year of growth. |
| Trees produce oxygen by absorbing carbon dioxide from the air. |
| Trees are large, generally single-stemmed, woody plants. |
| Trees live in cavities or hollows. |
| Trees grow using photosynthesis, absorbing carbon dioxide and releasing oxygen. |
| 2. An example entry, including metadata |
| Term: tree |
| Sent: Most trees add one new ring for each year of growth. |
| Quantifier: Most |
| Score: 0.35 |
| Before: . . . Notice how the extractor holds the core as it is removed from inside the hollow center of the bit. Tree cores are extracted with an increment borer. |
| After: The width of each annual ring may be a reflection of forest stand dynamics. Dendrochronology, the study of annual growth rings, has become prominent in ecology . . . |

The relevant statistics of the two datasets (i.e., the GenericsKB and Aristo Tuple KB databases) are shown in Table 4. There are three entries in Table 4 with the first two entries being the statistics of the original and an animal subset of the Aristo Tuple KB came with the dataset collections. According to a description of the dataset, the Aristo Animal Subset contains triples which at least one of the head and tail entities is identified as an animal class entity. The columns, entities, relations, triples, and entity classes correspond to the count of each unique items in the dataset respectively. On the other hand, the last entry in Table 4 denotes the statistics of the GenericsKB dataset used in the experiments. The GenericsKB Best subset is recommended by the authors Bhakthavatsalam et al. (2020) to use as it "contains the best, standalone generics". The GenericsKB Animal Subset is a resulting subset after the Pre-processing module described below. The first two columns "sentences" and "entities" in Table 3.1 correspond to the count of the raw sentences and entities as provided by the GenericsKB. The columns "sentences OIE" and "triples OIE" denote the number of sentences that contains at least one triple and the number of extracted triples after applying OpenIE6 parser. It should be noted that the value of "triples OIE" is not the number of unique triples, as it is plausible for different sentences to be tagged with identical triples if they contain the same entities.

TABLE 4

Dataset statistics of Aristo Tuple KB and GenericsKB

| | | | | |
|---|---|---|---|---|
| Aristo Tuple KB | entities | relations | triples | entity classes |
| | 6,465 | 1,605 | 282,594 | 50 |
| Aristo Animal Subset | entities | relations | triples | entity classes |
| | 1,410 | 132 | 19,629 | 39 |
| GenericsKB Best | sentences | entities | sentences OIE | triples OIE |
| | 1,020,868 | 129,987 | 749,348 | 863,326 |

Each of the blocks in FIG. 1*b* is now described in greater detail. The goal of the Pre-processing framework is to prepare the raw generic sentences for the subsequent Prompting task. As illustrated in the flowchart of FIG. 1*b*, there are three major steps involved in this process: A. Triple Annotation, B. Entity Linking, and C. Triple Extraction. The end result from the above steps is a domain specific corpus containing normalized sentences and the (head, predicate, tail) triples extracted from the sentences.

For Triple annotation, an Open Information Extraction (OpenIE) model is used which is capable of annotating the (head, predicate, tail) triple from a given sentence. This model is an external model that is used in the present disclosure for annotating the sentences from the Generic KB database. For example, the Generic KB may have a sentence such as "Most cats require high protein." The OpenIE model receives this input as one of N sentences housed in the Generic KB database and identifies the triple (i.e., annotates the triple) as head being Most Cats, tail being High Protein, and predicate being Require. The state-of-the-art OpenIE model generally adopts a neural network (NN) structure and training on large dataset, and the domain of the dataset varies by model. For instance, GraphLSTM (PENG et al., 2017) was trained on PubMed Central (ROBERTS, 2001) which is a medical dataset, while RnnOIE (STANOVSKY et al., 2018) and OpenIE6 (KOLLURU et al., 2020) were trained on QAMR (MICHAEL et al., 2017) which is a crowdsourcing QA dataset. OpenIE6 2 (KOLLURU et al., 2020) is adopted for triple annotation in the present disclosure. The main rationale for this choice is that OpenIE6 is the most updated version of the OpenIE4.2 parser (Soderland et al., 2013) used in constructing Aristo Tuple KB. Since the metadata from Aristo Tuple KB is involved in a large portion of the experiments, more consistency is preferred to keep the entities aligned. OpenIE6 was selected.

In addition, each sentence of the Generic KB is also received by a toolkit (e.g., Stanford Core NLP toolkit) which determine dependency (i.e., noun vs. verb) and part of speech (PoS) which further annotates what type of noun and verb are present in each sentence received from the Generic KB database. A PoS annotator and a dependency parser from CoreNLP 4 are used. The following PoS and dependency tags are of interests:

PoS Tags
- noun type: NN, NNS, NNP, NNPS
- adjective type: JJ, JJR, JJS
- verb type: VB, VBD, VBG, VBN, VBP, VBZ
- preposition: IN
- Determiner: DT
- conjunction: CC
- "to": TO Dependency Tags
- adjectival modifier: amod
- nominal modifier: nmod
- object: obj
- multiword expressions (MWEs): compound
- conjunct: conj A list of PoS tags relevant to the present disclosure is provided below with respective definitions for each tag.
- NN: Noun, singular or mass
- NNS: Noun, plural
- NNP: Proper noun, singular
- NNPS: Proper noun, plural
- JJ: Adjective
- JJR: Adjective, comparative
- JJS: Adjective, superlative
- VB: Verb, base form
- VBD: Verb, past tense
- VBG: Verb, gerund or present participle
- VBN: Verb, past participle
- VBP: Verb, non-3rd person singular present
- VBZ: Verb, 3rd person singular present
- IN: Preposition or subordinating conjunction
- DT: Determiner
- CC: Coordinating conjunction
- TO: "to"

A list of dependency flags relevant to the present disclosure is provided below.
- amod: adjectival modifier—An adjectival modifier of a noun (or pronoun) is any adjectival phrase that serves to modify the noun (or pronoun). The relation applies whether the meaning of the noun is modified in a compositional way (e.g., large house) or an idiomatic way (hot dogs).
- nmod: nominal modifier—The nmod relation is used for nominal dependents of another noun or noun phrase and functionally corresponds to an attribute, or genitive complement.
- obj: object—The object of a verb is the second most core argument of a verb after the subject. Typically, it is the noun phrase that denotes the entity acted upon or which undergoes a change of state or motion (the proto-patient).
- compound: compound—The compound relation is one of three relations for multiword expressions (MWEs) (the other two being fixed and flat). It is used for any kind of X0 compounding: noun compounds (e.g., phone book), but also verb and adjective compounds that are more common in other languages (such as Persian or Japanese light verb constructions). See further discussion at Two Nominals.
- conj: conjunct—A conjunct is the relation between two elements connected by a coordinating conjunction, such as and, or, etc. We treat conjunctions asymmetrically: The head of the relation is the first conjunct and all the other conjuncts depend on it via the conj relation.

The output of the toolkit (i.e., dependency and PoS annotation) along with output of the OpenIE (i.e., annotation of head-predicate-tail) along with data from the Aristo Tuple KB metadata database are all provided to an entity linking block. For the example provided in FIG. 1*b* (i.e., Generic KB database sentence "Most cats require high protein"), the entity linking provides the following output: Cats are animals, protein is substance, "most cats" is represented by amod dependency with "most" represented by JJS PoS tag and "cats" represented by NNS PoS tag, "high protein" is represented by amod dependency with "high" represented by JJ PoS tag and "protein" represented by NN PoS tag, "cats" and "require" are represented by nsubj dependency, where "require" is represented by VBP PoS tag, and "require" and "protein" are represented by obj dependency. The Entity linking aims at identifying the same real world entity with the known ones in a KG. As a downstream task, entity linking has been explored through supervised learning by training on the entity descriptions (Logeswaran et al. 2019) and utilizing the attribute embedding similarities (Trisedya et al. 2019); and through unsupervised learning by merging similar graph entities based on graph node embedding and graph structures. The entity linking task in the present disclosure, however, is different in two ways. First, the entities contained in the GenericsKB sentences are not labeled so connections cannot be made between them to any known entities for supervised learning. Second, unsupervised learning requires the training data with which the original sentences containing the known entities need to be available. Thus, the methods from entity linking tasks cannot be adopted. As the domain of the dataset is restricted to animal related sentences, a simpler rule-based approach is used to identifying a "core entity word". The linking between the OpenIE6 annotation and the known mono-length entities from Aristo Tuple KB is then examined over the core entity word.

For a head or tail entity in the annotated triple, a core entity word is identified through a series of rules as shown below, and the entity dependency type is labeled for record. The core entity is later used for entity matching to identify the entity class information. Algorithms 1 provided below is used as rules for identifying core entity as well as triple extraction. Line 1 to 2 identifies the core entity for an entity includes only one token. In this case, the core entity is itself. The entity dependency type is labeled as "single". Line 4 to 15 sets conditions for core entity identification when there exist more than one words in the annotated entity.

Algorithm 1 Rules for identifying core entity

```
Input: raw entity word/phrase e
Output: core entities ϵ0
1:   if number_of_words(e) == 1 then
2:       return e[0]
3:
4:   if preposition in dependency(e) then
5:       p_index = preposition_index(e)
6:       if noun_exists_before(p_index) and
         noun_exists_after(p_index) then
7:           n_index = first_noun_before_index(p_index)
8:           return e[n_index]
9:
10:  if conjunction in dependency(e) then
11:      return get_sub_entities(e)
12:
13:  if part_of_speech(e[-1]) is noun then
14:      if dependency(e[-1], e[-2])
         is noun modifier then
15:          return e[-1]
```

-continued

Algorithm 1 Rules for identifying core entity

```
16:
17:  if part_of_speech(e[-1]) is noun then
18:      return e[-1]
```

In Algorithm 1, line 4 to 8 deals with the case when there is a preposition PoS "IN" within the entity. The dependency type of entity is labeled as "preposition". If a preposition exist in the middle of the entity phrase, and if two noun type PoS exist before and after the preposition, then the core entity is the immediate noun entity before the preposition. For instance, the entity phrase "a variety of animals" is annotated with PoS "DT NN IN NNS". The core entity will be the word "variety" correspond to the tag "NN" before the preposition tag "IN". Another example entity phrase "offspring during summer" from the OpenIE6 is annotated with PoS "NN IN NN", which the word "offspring" is taken as the core entity. Additionally, line 10 to 11 considers the case when conjunction dependency type present in the entity phrase. The entities of this type is labeled as "conjunction". When there is a conjunctive word such as "and" and "or", the entities, if any, on both side of the conjunctive word are permuted to be the core entity, and the entities are reassigned for each permuted triple. There are two general cases for a conjunction and they are handled differently to obtain the sub-entities during the experiments: 1. The conjunctive word connects two non-noun type words. The core entity is the last word of the entity phrase, nothing else needs to be done. 2. The conjunctive word connects two noun type words. The entity is separated into two sub-entities by the conjunctive word. The core entities are the last word of the sub-entities. The triple is permuted so each triple only contains a sub-entity.

Table 5 shows some example entity phrases from the dataset and how the sub-entities are handled in each case. The way the conjunction dependency types are handled takes advantage of the OpenIE parser. It assumes that the head and tail entities annotated by the parser are nominal entities. Thus, the rules used to identify the sub-entities cannot be generalized to other tasks. In addition, only the majority of the conjunction dependencies, such as the examples shown in Table 5, are covered in the second case when sub-entities are considered. When one more multiple modifiers exists before the entities, it could be difficult to determine if the modifiers are to be applied to both conjunctive entities or only one of them. For instance, consider the following entity phrases: 1) "cute cats and rabbits", 2) "cute cats and furry rabbits", 3) "cute cats and pet rabbits". Although the core sub-entities in all phrases are "cats" and "rabbits", the adjectival modifiers that come before the entities are different. For entity phrase 1), "cute" can be describing both "cats" and "rabbits", however for phrase 2), "cute" is more likely to be modifying only "cats" using the rule of thumb, which if there are another modifier before the entity after the conjunction word, then the modifier before the first word is only describing the entity before conjunction word. On the other hand, for phrase 3), it is ambiguous if the word "cute" is only describing the entity "cats" since "pet rabbits" is a type of rabbit. With or without the word "pet" will make a difference in how refined the category of rabbit the phrase is referring to. Such ambiguity in mapping the entity modifiers are considered as a limitation of the rules described herein for conjunction handling.

TABLE 5

Examples of two conjunction cases and handling

| Case | Entity | PoS | Dependency | Subentity | Core |
|---|---|---|---|---|---|
| Case1 | intelligent and playful birds | JJ CC JJ NNS | conj:and govenor:intelligent dependent:playful | N/A | birds |
| Case1 | four or five months | CD CC CD NNS | conj:or govenor:four dependent:five | N/A | months |
| Case2 | cattle and other animals | NNS CO JJ NNS | conj:and govenor:cattle dependent:animal | cattle, other animals | cattle, animal |
| Case2 | winter wren and rosy finch | NNP NNS CC JJ NNS | conj:and govenor:wren dependent:finch | winter wren, rosy finch | wren, finch |

Additionally, line 13 to 15 of Algorithm 1 covers noun modifier cases when all the above cases are not satisfied. If the last word in the entity is of noun type and the immediately preceding word forms an "amod", "nmod" or "obj" dependency, then the last word will be used as the core entity. The type of this entity is labeled as the dependency type identified. The above conditions can cover the majority of the head entities that are annotated by OpenIE6. Last, line 17 to line 18 takes a straightforward approach to take the last noun type word as the core entity if none of the above cases are satisfied. The tail entities in the dataset exhibit more complicated structures. They are often longer phrases and contain verb phrases. For instance, the annotated tail entity "together to mate" from the sentence "Aardvarks are solitary animals and only come together to mate." is labeled by CoreNLP as a verb phrase with the PoS "RB TO VB". The word "mate" can be both a noun meaning "each of a pair of birds or other animals." or a verb meaning "(of animals or birds) come together for breeding; copulate." A close nominal replacement of the phrase is "mating" that conveys similar meaning with the verb meaning of "mate". In this case, a core entity cannot be identified.

A triple is selected to create an Animal Subset from the GenericsKB when the following conditions are satisfied: 1) The triple forms a complete (head, predicate, tail) instance. 2) The triple only contains known core entities within the 50 entity classes. 3) The head and tail core entities contain at least one animal entity. 4) The length of the entities and predicates cannot exceed 5 tokens. Condition 1) excludes the invalid triples caused by the parser limitation. In some cases when the sentences exhibit slightly more complicated grammatical structures, OpenIE6 tends to leave out the tail entity and annotate an incomplete triple. Take the sentence "Animals also feel and respond to changes in their environment." as an example. The two triples annotated by OpenIE6 are (Animals, feel) and (Animals, respond, to changes in their environment). The tail entity in the first triple, which is supposed to be the same with the that of the second triple, is missing. The main cause of the error is likely due to the conjunctive dependency between the predicates "feel" and "respond". Although it is plausible to fix this type of annotation errors by utilizing the dependency annotations of the sentences, these errors are trivial and the focus of this dissertation is not on how to improve relation extraction parser. Conditions 2) and 3) exist to limit the scope of the experiments. As previously mentioned, only triples with both known head entity and tail entity are considered for simplicity. The known entities are the 6,465 entity words obtained from Aristo Tuple KB. Among them, 571 are animal related entities as discussed herein. By filtering entities satisfying conditions 2) and 3) above, the resulting sub-dataset can be limited to the animal domain. Finally, the presence of condition 4) helps filtering out some bad triples. The main consideration for leaving out excessively long entities and predicates is to make more accurate predictions in mask-filling task later. Additionally, an observation is made that common English fixed expressions that can be equivalent to a predicate are often shorter than length 5.

The above operation takes place in the triple extraction block which provides the head and the tail in which the head, the predicate, and the tail are extracted based on the metadata information. In the example provided in FIG. 1*b*, the head is extracted as cat and the tail is extracted as animal, and protein is extracted as food.

The output of the pre-processing block is provided to a customized structured database identified in FIG. 1*b* as "structured dB1". The structured dB1 includes M rows, where M is less or equal to N (i.e., number of rows or sentences in the Generic KB database). In other words, M refers to Aristo Tuble KB metadata database matches to the Generic KB database. That is, there may be sentences in the Generic KB database that do not have matching metadata in the Aristo Tuble KB metadata database. Those sentences are ignored and only entries that have a match in the Aristo Tuble KB metadata database are included in the structured dB1. Therefore, the structured dB1 includes M rows. Each row includes a plurality of columns with values for each parameter based on output of the pre-processing block. An example of the structured dB1 is provided in Table 6, below.

In morphology and lexicography, a lemma is the canonical form, a dictionary form, or citation form of a set of word forms. In English, for example, break, breaks, broke, broken and breaking are forms of the same lexeme, with break as the lemma by which they are indexed. A lemmatized version of the embeddings were also computed for each predicate. A lemmatizer was applied for each predicate. These lemmas are also found in dB 1 structure, as provided in Table 6. Lemmas are generated by an external tool, e.g., WordNetLemmatizer, NLTK 3.4.5. Additional information regarding lemmas are provided related to relation representation and their use, as described below. Each of the identified head, tail, and predicate is lemmatized, as it appears in Table 6. For example, for the sentence "Most cats require high protein", the lemma for head is cat, lemma for tail is protein, and lemma for predicate is require.

TABLE 6

Structure of the structured dB1 (columns)

| Col. No. | Parameter | Definition | Value for parameter (for example sentence: "Many fish eat plants, while others such as the shark, eat other fish") |
|---|---|---|---|
| 1 | Idx | Index i from Generic KB Database | 350676 |
| 2 | Quant | quantifier, quantity of the head entity (if any) | Many |
| 3 | Head | Head entity | Fish |
| 4 | Pred | Predicate | eat |
| 5 | Tail | Tail | Plants |
| 6 | Sentence | Complete sentence from Generic KB | Many fish eat plants, while others such as the shark, eat other fish |

TABLE 6-continued

| Structure of the structured dB1 (columns) | | | |
|---|---|---|---|
| Col. No. | Parameter | Definition | Value for parameter (for example sentence: "Many fish eat plants, while others such as the shark, eat other fish") |
| 7 | Head_Start_Idx | Index of start of Head in sentence (starts at 0, counting words) | 1 |
| 8 | Head_End_Idx | Index of end of Head in sentence (index of where head ends + 1) | 2 |
| 9 | Tail_Start_Idx | Index of start of Tail in sentence | 3 |
| 10 | Tail_End-Idx | Index of end of Tail in sentence (index of where Tail ends + 1) | 4 |
| 11 | Pred_Start_Idx | Index of start of Predicate in sentence | 2 |
| 12 | Pred_End_Idx | Index of end of Predicate in sentence (index of where Predicate ends + 1) | 3 |
| 13 | Head_PoS | Head entity PoS | NNS |
| 14 | Tail_PoS | Tail entity PoS | NNS |
| 15 | Pred_PoS | Predicate PoS | VBP |
| 16 | Sent_PoS | PoS tag for every word | JJ NNS VBP NNS, IN NNS JJ IN DT NN, VB JJ NN |
| 17 | Head_Lemma | Lemmatized Head entity | Fish |
| 18 | Tail_Lemma | Lemmatized Tail entity | Plant |
| 19 | Pred_Lemma | Lemmatized Predicate | Eat |
| 20 | Head_Dep_Type | Head entity dependency type (obtained from dependency parser) | Single |
| 21 | Head_Core | Core entity of Head entity | Fish |
| 22 | Tail_Dep_Type | Head entity dependency type (obtained from dependency parser) | Single |
| 23 | Tail_Core | Core entity of Tail entity | Plant |
| 24 | Pred_Prep | Predicate preposition (if any) | Null |
| 25 | Head_Class | Head entity super-class from Aristo Tuple DB | Fish |
| 26 | Tail_Class | Tail entity super class from Aristo Tuple DB | Plant |
| 27 | Masked_Sent | Masked sentence which "masked" out predicate | Many fish <mask> plants, while others such as the shark, eat other fish |

In Table 6 the last entry is Masked sentence which refers to replacing the identified predicate with a mask. For example, in the example provided in Table 6, the predicate is "eat." Thus, the masked sentence becomes: "Many fish <mask> plants, while others such as the shark, eat other fish." Not every column receives an entry (i.e., a column entry may be null). For example, the 24$^{th}$ column is Pred_Prep and for the example provided in Table 6, this entry is null based on Algorithm 1.

Figure 3A:
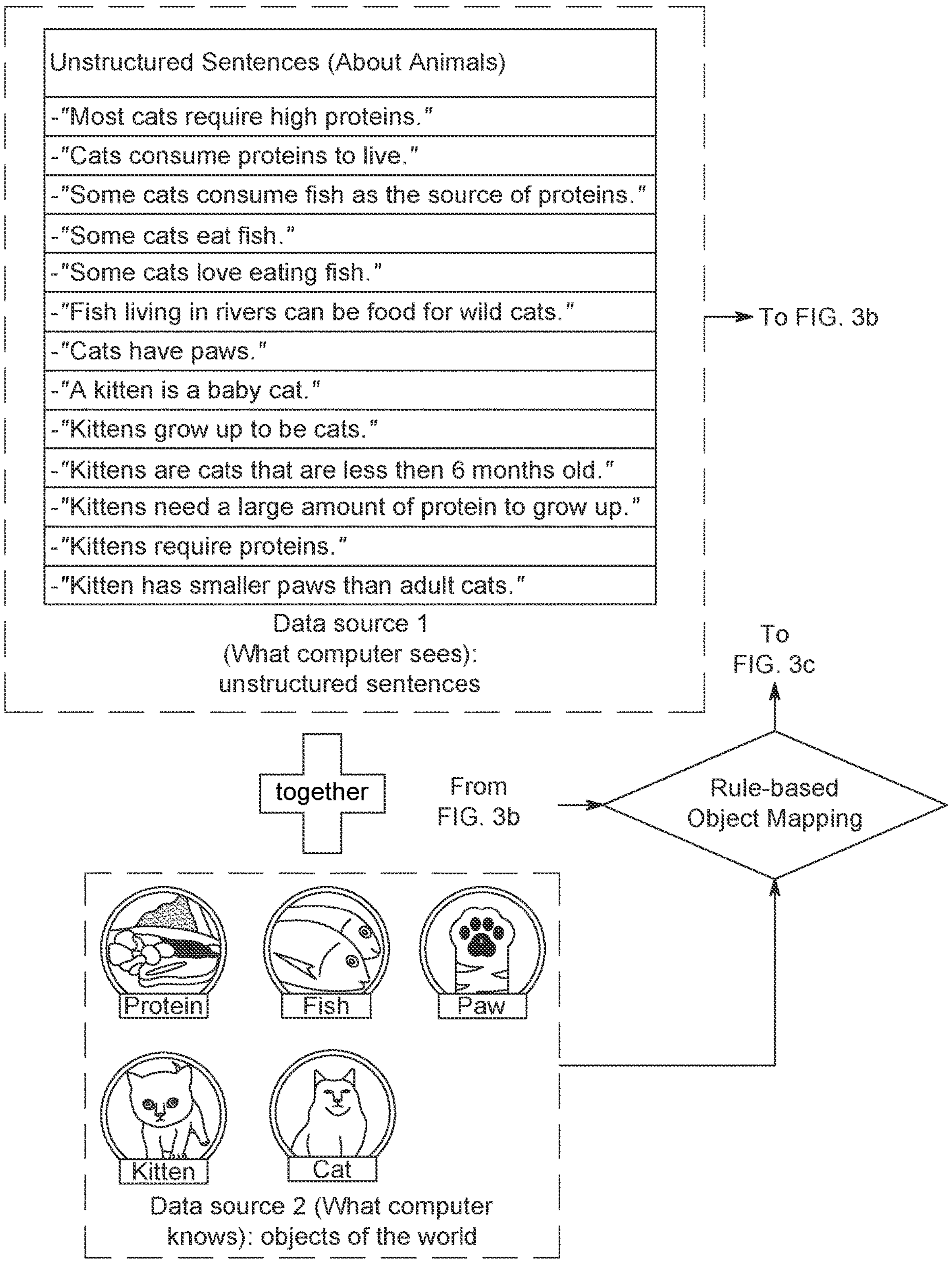
FIGS. 3*a*-3*c* are schematics showing how an input provided to the pre-processing block of FIG. 1*b* is parsed.
Figure 3B:
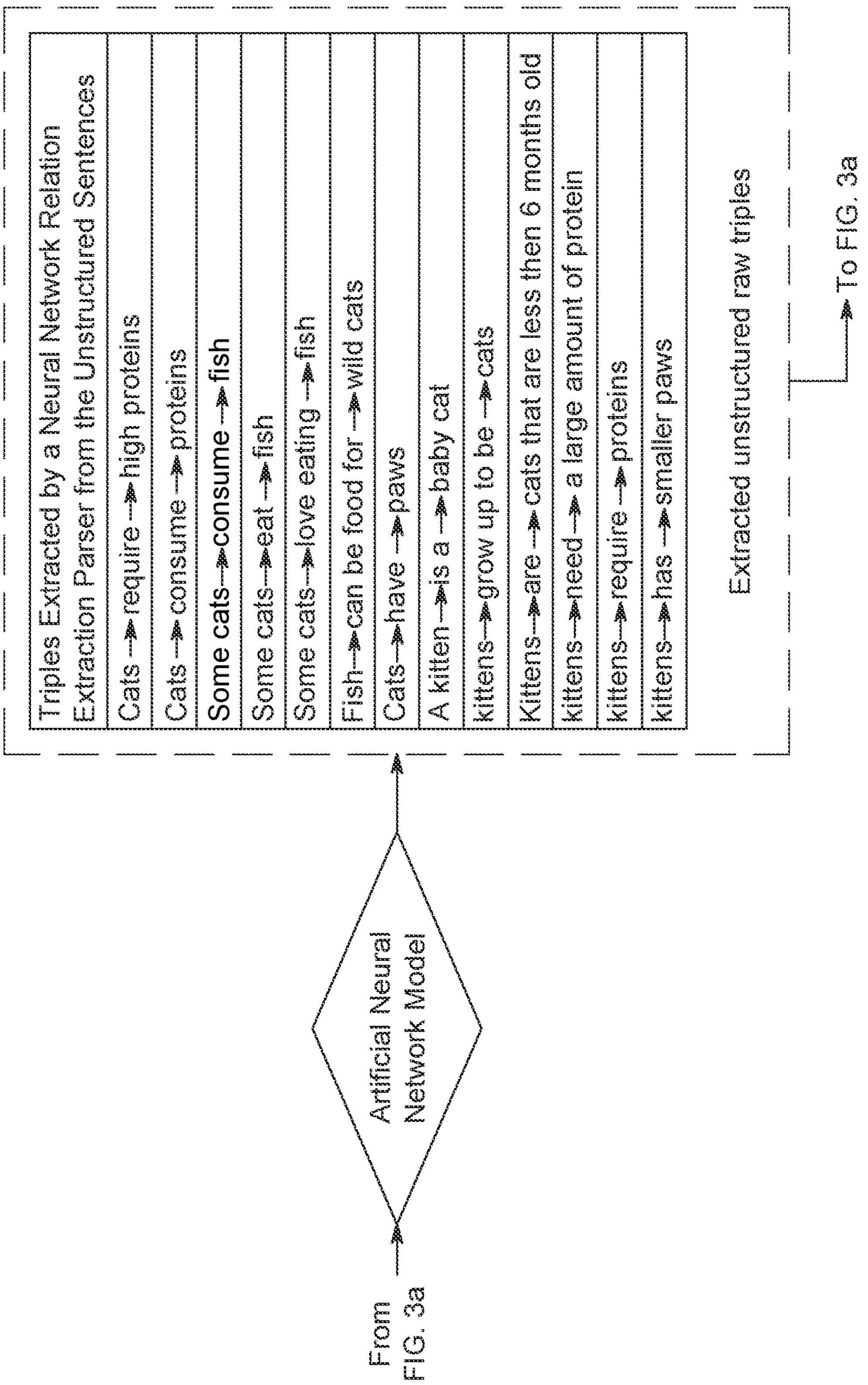
Figure 3C:
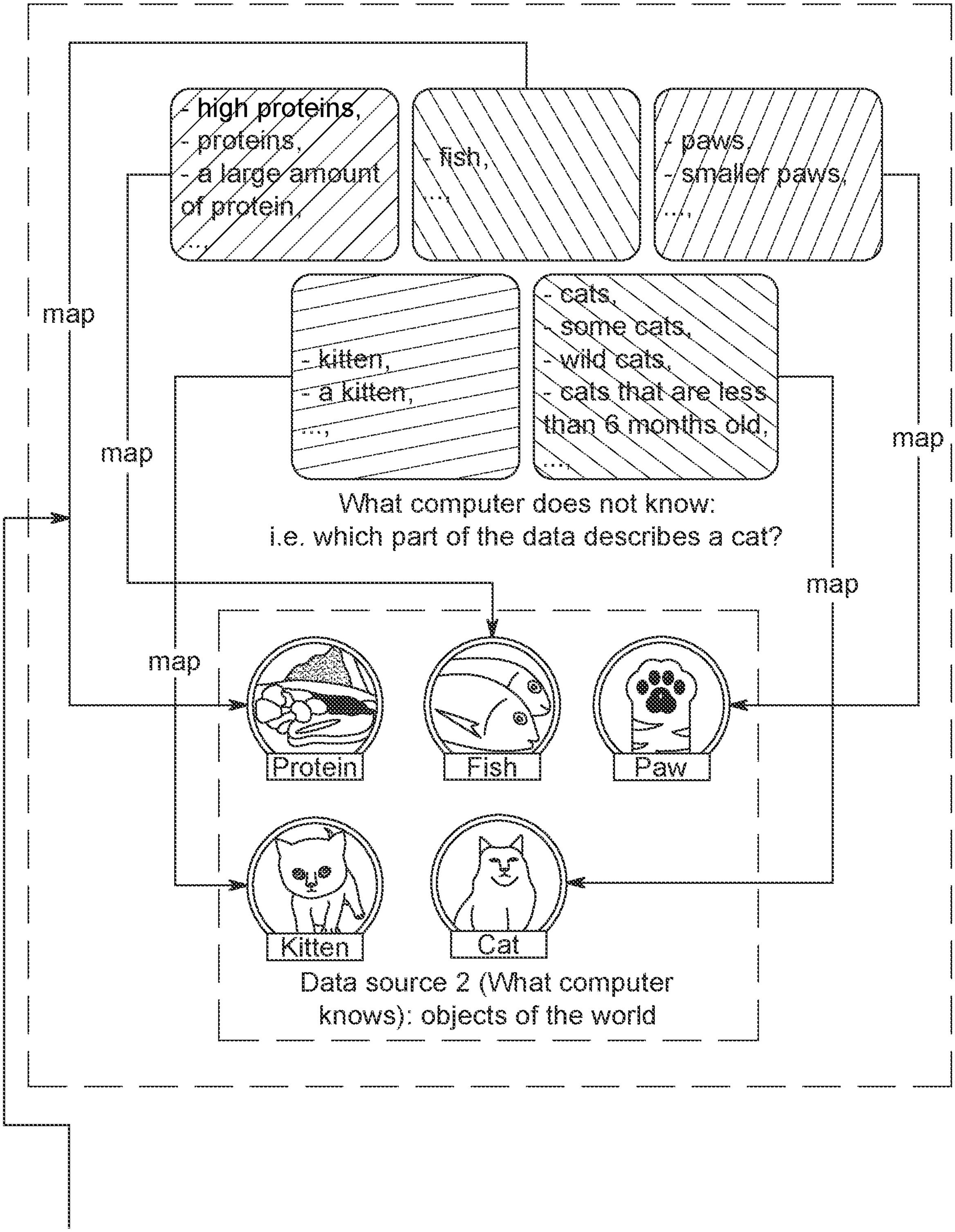

Referring to FIG. 2 an example of input to the pre-processing blocks as discussed above is provided in an example form. Again unstructured sentences are provided as input to a processor which is combined with apriori data representing objects of the world known by the processor. What is shown in FIG. 2 establishes the input to the pre-processing block. Referring to FIGS. 3*a*-3*c*, this input is parsed out as individual steps. The unstructured sentences are fed to a neural network to thereby extract unstructured raw triples, while apriori data is used with a rule-based object mapping to generate a relationship between the extracted triples and the apriori data which constitutes the pre-processing block.

Referring back to FIG. 1*b*, next, prompting is discussed. The goal of the prompting framework is to obtain a pool of predicate candidates which can be used to generate relation representations. Prompting templates are generated based on the input sentences, extracted triples and the entity metadata. A comparison group which only masks the predicate of the original sentence is also included. For an input sentence x and a triple (head, predicate, tail) denoted as (h, p, t), a masked sentence x' is generated by masking the predicate token(s) of x. The entity class of the head and tail entities are denoted as $c_h$ and $c_t$. The first prompting template $p_1$, is a concatenation of the following elements: Sentence (see discussion of Table 6)+Head (see discussion of Table 6)+<MASK>+Pred_Prep (see discussion of Table 6, if any)+ Tail (see discussion of Table 6), wherein the symbol "+" represent concatenation. The second prompting template $p_2$, is a concatenation of the following elements: Head (see discussion of Table 6)+is/are+Head_Class (see discussion of Table 6)+Tail (see discussion of Table 6)+is/are+Tail_Class (see discussion of Table 6)+Masked_Sent (see discussion of Table 6), wherein the symbol "+" represent concatenation. Two prompting functions $f_1$ and $f_2$ which map x to prompts $p_1$ and $p_2$ respectively are defined as the following:

$$f_1(x,h,t) \rightarrow p_1 : x \cdot h[\mathrm{MASK}]t.$$

$$f_2(x,h,t) \rightarrow p_2 : h \text{ be } c_h \cdot t \text{ be } c_t \cdot x'.$$

Table 7 illustrates an example of the generated prompts based on the prompting functions above when an input sentence and its associated input triple are given.

TABLE 7

| Prompt design illustrated by an example | | |
|---|---|---|
| Name | Notation | Example |
| Sentence | x | Most cats require high proteins. |
| Triple | (h, p, t) | (cats, require, high proteins) |
| Entity Class | $c_h$, $c_t$ | animal_n1, substance_n1 |
| No Prompt | x' | Most cats [MASK] high proteins. |
| Prompt 1 | $f_1$(x, h, t) → $p_1$ | Most cats require high proteins. Cats [MASK] high proteins. |
| Prompt 2 | $f_2$(x, h, t) → $p_2$ | Cats are animal. High proteins are substance. Most cats [MASK] high proteins. |

The input to the prompt generation block is the above-described structured dB (denoted in FIG. 1*b* as Structured dB1). The output of the prompt generation is a new structured database, denoted in FIG. 1*b* as Structured dB2. The difference between the Structured dB1 and the Structures dB2 is two additional columns provided in Table 8 for the example provided in Table 6.

TABLE 8

| Two additional columns added to the structure of Table 6 | | | |
|---|---|---|---|
| Col. No. | Parameter | Definition | Value for parameter (for example sentence: "Many fish eat plants, while others such as the shark, eat other fish") |
| 28 | Prompt Template 1 | Sentence + Head + <MASK> + Pred_Prep (if any) + Tail | Many fish eat plants, while others such as the shark, eat other fish. Fish <mask> plants |
| 2 | Prompt Template 2 | Head + is/are + Head Class + Tail + | Fish are fish. Plants are plant. Many fish <mask> plants, |

TABLE 8-continued

Two additional columns added to the structure of Table 6

| Col. No. | Parameter | Definition | Value for parameter (for example sentence: "Many fish eat plants, while others such as the shark, eat other fish") |
|---|---|---|---|
| | | is/are + Tail_Class + Masked_Sent | while others such as the shark, eat other fish. |

Next masks are described. The masked sentence x' is obtained by masking the predicate p from the original input sentence x. It serves as the comparison group in the experiments, and is referred to as the "No Prompt" group. By feeding the masked sentences into the LMs, the predictions will be made to generate most possible output based on the context of the rest of the sentences. In frequent-shot cases, this template produces reasonable predictions that are semantically similar to the masked predicate. Prompt 1 aims at testing whether the LMs can pick up the prompt correctly. In the case when the predicate includes multiple tokens, it is possible that the LMs cannot pick up the full context of the predicate, but instead predict based on a neighboring token of the entities. For example, take an input sentence "Camels can survive extremely drought desert environments." with triple (camels, survive, desert environments). After applying the Prompt 1 template, the sentence becomes "Camels can survive extremely drought desert environments. Camels [MASK] desert environments." The preferred predictions are "survive", "endure", and "bear". However, if the LMs pick up the incorrect contexts, then the prediction can be "drought". Prompt 2 aims at checking if incorporating entity type metadata would help the LMs make better predictions. Since the LMs are trained on a large amount of general dataset, prompting with the domain might help the LMs regulating the scope of the predictions. Since every input triple contains at least one animal or animal subclass words in the dataset, certain words cannot make sense for mask-filling. For instance, given a head word "bacon" with class "substance n1" and a tail word "pig" with class "animal n1", ideally, by prompting "substance" and "animal", it is plausible to eliminate certain predicates such as "eat", "consume", and "cook", since in nowhere a "substance" can do these things to an "animal". As a result, the output of the prompting block by the LMs is a list of relation candidates each with a confidence score. The top predetermined number of candidates (e.g., 10) are chosen and these are provided to the Relation Fusion block.

Relation mapping is similar to an unsupervised binary classification problem, in which two aspects need to be considered. First, it needs to be identified whether an extracted relation is a legitimate relationship. It is assumed that after pre-processing and filtering, all the triples extracted by the OpenIE6 parser are legitimate. Second, the classification of the extracted relation needs to be determined. This problem involves determining whether the extracted relation can be mapped together with a similar relation.

Prediction and only the lemmas were considered to contribute to the vocabularies when creating the embeddings. If repeating lemmas appeared within the same predicate predictions, the probability scores were accumulated. Thus, each predicate could have less than top n non-zero values in the embedding dimension. Applying lemmatizer could effectively reduce the dimensionality of the predicate embeddings as the top n predictions from the LMs often contained the same word in different forms.

An LM type model, e.g., RoBERTa predicts a single token output and yields a probability for every prediction. Thus, a predicate can be represented by directly using the top n predictions. All unique predictions from the whole dataset are used to generate a vocabulary list, so embeddings can be derived for each predicate. The embeddings are generated in a one-hot vector like manner, except the prediction probability scores are used to fill in the dimensions. A more straight forward mathematical description of the embedding generation is described as the following: It should be noted that the top n probability scores are not normalized over the n dimension when applied to embedding generation. This is because the LM model's final layer already performs a dimensional normalization over the probabilities. The scores represent the likelihood over all vocabularies the LM has. If another normalization is applied to the top n dimension, then each of the prediction score will no long stay within the same LM dimension, but rather fits within each of its own dimension.

Referring to Algorithm 2 provided below, predicate embedding generation is provided.

Algorithm 2 Generation of predicate embedding

```
Input: predictions for the predicates P = {P_1, P_2, ..., P_m},
probability scores for the predicates S = {S_1, S_2, ..., S_m}
Output: embeddings for the predicates W = {w_1, w_2, ..., w_m}
    vocabulary = indexing(unique(P))

    for i in range(m) do
        w_i = [0] × length(vocabulary)
        for prediction, score in zip(P_i, S_i) do
            index = get_token_index_p(vocabulary, prediction)
            w_i[index] = score

    return {w_1, w_2, ..., w_m}
```

To further elucidate the predicate embedding generation, a limited example is provided to describe the operational specifics of this portion of the present disclosure. Suppose the universe of the sentences includes three sentences and further suppose the top three predicate candidates are chosen (note the example in FIG. 1*b* calls for top 10 candidates). These sentences are: 1) Most cats require high protein; 2) Most mice hate lemon juice; and 3) All animals require water. Further suppose for each of these sentences the predicate candidates along with the probability scores from the LMs is provided as: 1) require (0.8), need (0.7), require (0.6); 2) hate (0.7), dislike (0.3), despise (0.2); and 3) require (0.9), need (0.5), necessitate (0.4). Initially temporary arrays for each sentence is generated whereby non-unique candidates are eliminated. Thus, these temporary arrays include: 1) Temporary Array {require, need} (2 elements)—Excludes repeating "require"; 2) Temporary Array {hate, dislike, despise} (3 elements); and 3) Temporary Array {require, need, necessitate} (3 elements). From these predicate candidates, a flattened vocabulary array is generated: {require, need, hate, dislike, despise, necessitate) (6 elements)—Exclude repeating "require" and "need" from temporary arrays of sentence 1 and 3, thus resulting in 6 elements (i.e., 2 from sentence 1, three from sentence 2, and 1 from sentence 3). Algorithm 2 converts flattened arrays into a numerical representation by incorporating the probabilities for each candidate and placing 0s for the remainder of sentences: 1) {1.4,0.7,0,0,0,0}—Note, the probability value for "require" is added (0.8+0.6) since there were two such words; 2) {0, 0,0.7,0.3,0.2,0}; and 3) {0.9,0.5,0,0,0,0.4}, note the probability values from eliminated words "require" and "need" which were non-unique as compared to sentence 1, are placed in the numerical representation array for sentence 3. There are thus three numerical representation arrays for these three sentences: 1) {1.4,0.7,0,0,0,0}, 2) {0, 0,0.7,0.3,0.2,0}, and 3) {0.9,0.5,0,0,0,0.4}.

With the predicate representations, a minibatch K-Means is adopted for clustering of the embeddings. Clustering refers to the task of grouping a set of objects in such a way that objects in the same group, which is called a cluster, are more similar to each other than to those in other groups.

Two well-known types of clustering methods are "hard clustering" and "soft clustering". A representative "hard clustering" algorithm is the K-means algorithm, which is performed by partitioning documents based on the nearest mean with each document belonging to only one cluster. While "soft clustering", such as fuzzy c-means algorithm that proposed on top of k-means, allows each document to belong to multiple clusters using a variable measures the degree of belongingness. Different approaches mixed with statistical and ontological based methods have been presented over years.

K-means is one of the simplest unsupervised learning algorithms that solve the clustering problem. It aims at partitioning a set of n data points, $X=\{x_1, x_2, x_3, \ldots, x_n\}$, into a set of k clusters, $C=\{c_1, c_2, c_3, \ldots, c_k\}$. The main idea is to find a set of k cluster centroids, $V=\{\mu_1, \mu_2, \mu_3, \ldots, \mu_k\}$, such that the sum of the squared errors between the centroids $\mu_j$ ($\mu_j \in V$) of each cluster and the points $x_i$ ($x_i \in c_j$) in that cluster is minimized (Equation 1, Sum of squared errors). The squared error between each centroid and the points in that cluster is defined by the sum of Euclidean distance (Equation 2, Euclidean distance of two n-dimensional points), between the centroid and each point. Euclidean distance is defined as the straight-line distance between two points in Euclidean space, or Cartesian space, in mathematics.

$$J(C) = \sum_{j=1}^{k} \sum_{X_i \in C_j} \|\mu_j - X_j\|^2, \tag{1}$$

$$\|a - b\|^2. \tag{2}$$

Minimizing the inner sum of Equation 1 ensures that points assigned to each cluster are the closest to corresponding centroids as compared to other centroids. Minimizing the outer sum of equation 2.1 ensures that centroids distribute properly to best partitioning the dataset. The general steps of k-means are shown in Algorithm 3, provided below. As defined by Algorithm 3, the algorithm takes three inputs, the cluster number k, the set of n data points $X=\{x_1, x_2, x_3, \ldots, x_n\}$, and the set of randomly initialized k centroids $V=\{\mu_1, \mu_2, \mu_3, \ldots, \mu_k\}$. The process of the algorithm starts with calculating the Euclidean distance (Equation 2) between each data point x! and centroids $\mu_j \in M$. Then the data point is assigned to the cluster that the Euclidean distance between the centroid of which cluster and the data point is the shortest among all the centroids. After all data points are assigned to clusters, recalculate each centroid based on the data points in each cluster using Equation 3, which describes recalculation of new cluster centroids.

$$\mu_j = \frac{1}{m_j} \sum_{j=1}^{m_j} X_j. \tag{3}$$

If the recalculated centroids are the same with the old centroids then the process is finished, otherwise repeat the process from calculating the Euclidean distance between each data point and centroids. The main steps of k-means are shown in Algorithm 3, provided below.

Algorithm 3—K-Means Clustering Algorithm

Let $X=\{x_1, x_2, x_3, \ldots x_n\}$ be the set of data points, and $V=\{\mu_1, \mu_2, \mu_3, \ldots \mu_k\}$ be the set of centroids.

1. Randomly select k cluster centroids;
2. Calculate the Euclidean distance between each data point an centroids using Equation 2;
3. Assign the data points to the nearest cluster centroid;
4. Recalculate centroids using Equation 3;
5. Compare new centroids to old centroids
   a. If the same, then done;
   b. If not the same then go back to step 2

A k-means clustering algorithm is useful in representing learning features in machine learning classification task. A variation of the standard k-means algorithm is the spherical k-means algorithm, for feature learning from unlabeled images. Spherical k-means algorithm uses a cosine similarity based function instead of the Euclidean distance in measure of how close each data points are to the centroids. In this case, both the data points and centroids are initialized to unit vectors going out from the origin. In order to find the closest centroid for each data point, the angle between two vectors are used to be the measure of how close two points are. The magnitudes of the angles between two vectors can then be represented with the cosine values between the vectors. These magnitudes range from 0 to 1. The closer two vectors are, the closer the cosine value is to 1 due to the property of cosine values. The property of unit vectors then suggest that the cosine value of two unit vectors is calculated with the dot product of the vectors (Equation 4, Dot product of two n-dimensional unit vectors a and b).

$$\text{Cosine value of unit vectors } a = [x_1, x_2, \ldots, x_n] \text{ and } b = [y_1, y_2, \ldots, y_n] \text{ is: } a \cdot b = x_1 y_1 + x_2 y_2 + \ldots + x_n y_n. \tag{4}$$

The equation for updating centroids is also adjusted to fit the cosine-based algorithm. The mean of all the data points within one cluster then becomes the normalized sum vector of all data point vectors (Equation 5, Recalculation of new centroid in spherical k-means), where $\mu_m$ represents the new centroid for cluster m, $x_j$ represents the j-th vector in cluster m, and mi represents the i-th vector in m-th cluster. The steps of spherical k-means algorithm do not have 12 major changes except for all the data points and centroids have to be initialized to unit vectors (based on Algorithm 4 below).

$$\mu_m = \left\| \sum_{j=1}^{m_i} X_j \right\|. \tag{5}$$

Algorithm 4—Steps in Spherical k-Means Clustering

Let $X=\{x_1, x_2, x_3, \ldots x_n\}$ be the set of data points, and $V=\{\mu_1, \mu_2, \mu_3, \ldots \mu_k\}$ be the set of centroids.

6. Normalize all data points to unit vectors;
7. Randomly select k unit vectors to be cluster centroids;
8. Calculate the Euclidean distance between each data point and centroids using Equation 4;
9. Assign the data point to the nearest cluster centroid;
10. Recalculate centroids using Equation 5;
11. Compare new centroids to old centroids
    a. If the same, then done;
    b. If not the same then go back to step 3

The default parameters with maximum iteration 100, batch size 1024, and a random seeding 0 are used. An Elbow method is adopted in order to find the optimal K-value. The Elbow method runs multiple iterations of the clustering algorithm with a different K-value while computing a score for each iteration. It measures whether increasing the K-value improves the resulting score. The score measures the Sum of Squared Distance (SSD) of the data points to the cluster centroids. When K-value equals to 1, which means all the data points are clustered to a single cluster, the SSD score should reach it maximum. “The idea behind Elbow method is that adding more clusters will eventually not result in significantly better modeling of the dataset. More precisely, when clustering a dataset with K=1, 2, 3, . . . , the change in the resulting clusters when going from K to K+1 will have a large variance. However, as the k-value becomes larger, the variance for adding more clusters will eventually converge to 0. The score first converges very fast, then slows down as introducing more clusters will not cause more effects to the cluster structures”. The optimal K-value is determined when the convergence vastly slows down. To shrink the range of K-value, a preliminary inspection first runs the Elbow method over a large step size of 100 from 1 to 800 over all prompt designs. The preliminary results show that all SSD scores converge before the K-value reaches 300. Thus, a more refined Elbow method is applied to a K-value of range 1 to 300 and the Elbow results are only reported on this range.

Within the clusters that were labeled to have the same sentiment feature, different semantic meanings across these clusters were observed. The consistency of the clusters was confirmed using a “split value” heuristic which was computed based on cluster similarity and cluster diversity. The split value also served as an indicator for how much ambiguity the dataset contained which helped analyze the resulting clusters.

After clustering, each crisp cluster contains a set of predicate representations. Since each predicate is represented by embeddings of the LM predictions, the cluster can then be treated as containing a set of feature vocabularies. The same vocabulary token can appear multiple times across different embeddings, and the prediction probability also varies for different occurrence. For each vocabulary token in the same cluster, an entropy is calculated to rank the information that vocabulary can provide to the cluster. In Equation 4, for a vocabulary v that appeared n times in a single cluster $C_i$. The entropy H(v) of that vocabulary with respect to cluster Ci is computed as the sum of entropy of the individual occurrence probability $p(v_i)$.

$$H(v) = -\sum_{i=1}^{n} p(v_i)\log p(v_i) \tag{4}$$

Entropy scores were computed and ranked for the vocabularies in each resulting clusters. A preliminary analysis on the entropy scores indicated that the distributions were very skewed. For example, Table 9 shows an example of top 10 entropy scores and frequency distributions of two clusters, Cluster 0 and Cluster 10. Table 10 illustrates the corresponding mean values and standard deviation values of the example Cluster 0 and Cluster 10. A natural logarithm is applied to the entropy scores for smoothing purpose. Average probability was computed over all occurrence of the same item in the cluster

TABLE 9

Entropy statistics of example clusters from P1-Lemma

| | token | entropy | log_entropy | freq | avg_prob |
|---|---|---|---|---|---|
| 0 | live | 55.351663 | 4.013707 | 459 | 0.866372 |
| 1 | be | 8.324907 | 2.119252 | 204 | 0.011533 |
| 2 | can | 6.105476 | 1.809186 | 43 | 0.056082 |
| 3 | sleep | 5.815426 | 1.760514 | 180 | 0.007158 |
| 4 | die | 5.743288 | 1.748032 | 182 | 0.006776 |
| 5 | thrive | 5.684866 | 1.737807 | 137 | 0.010688 |
| 6 | breed | 5.645284 | 1.730821 | 172 | 0.007850 |
| 7 | survive | 4.660729 | 1.539172 | 140 | 0.008528 |
| 8 | up | 4.583840 | 1.522537 | 16 | 0.185042 |
| 9 | reside | 3.918128 | 1.365614 | 103 | 0.010290 |
| 0 | occur | 16.250569 | 2.788128 | 815 | 0.978317 |
| 1 | appear | 10.872638 | 2.386249 | 792 | 0.002939 |
| 2 | be | 6.070219 | 1.803395 | 512 | 0.002548 |
| 3 | live | 5.340505 | 1.675320 | 293 | 0.004095 |
| 4 | reside | 2.238160 | 0.805654 | 351 | 0.001058 |
| 5 | remain | 2.108146 | 0.745808 | 428 | 0.000786 |
| 6 | arise | 1.916142 | 0.650314 | 535 | 0.000555 |
| 7 | exist | 1.675912 | 0.516358 | 535 | 0.000471 |
| 8 | begin | 1.469221 | 0.384732 | 96 | 0.003276 |
| 9 | can | 1.464035 | 0.381196 | 10 | 0.076126 |

(a) Cluster 0 top 10 statistics.
(b) Cluster 10 top 10 statistics.

TABLE 10

Metadata statistics of example clusters in P1-Lemma group.

| Type | Column | Cluster 0 | Cluster 10 |
|---|---|---|---|
| mean | entropy | 0.9582 | 0.6131 |
| | log entropy | −2.0637 | −2.9676 |
| | frequency | 19.3316 | 60.7245 |
| | avg probability | 0.0195 | 0.0153 |
| std | entropy | 4.2237 | 2.1188 |
| | log entropy | 1.9403 | 2.3632 |
| | frequency | 48.4257 | 57.0615 |
| | avg probability | 0.0701 | 0.0989 |

From Table 9, it can be seen that in Cluster 0 with 187 feature vocabularies, there was a large gap between the top one and the top two entropy scores. However, in Cluster 10 with 98 feature vocabularies, there was not a large gap between the first two scores and the third score. In order to better understand the trend of the distributions, a natural logarithm was applied to the entropy scores to smooth out the values. Although after smoothing, the frequency values still outweighed the average probability scores in the ranking of the log entropy scores, the logarithm was able to alleviate cases when the frequency values of the vocabularies were close but the probability scores vary. An example can be the fifth token “remain” and the sixth token “arise” from Cluster 10.

The labels of each cluster were generated from the vocabulary with the top entropy scores. A heuristic was applied to generate the cluster labels as shown in Algorithm 5, below.

Algorithm 5 - Rules for identifying cluster label of a single cluster

```
Input: vocabularies V = {v0, v1, ..., vn} and log
entropy scores S = {s0, s1, ... , s0}
Output: a set of text labels L
 1:      ql = first_quartile(S)
 2:      q3 = third_quartile(S)
 3:      iqr = q3 − ql
 4:      upper_whisker = Q3 + 1.5 * iqr
 5:
 6:      if ∃ si > upper_whisker then
 7:         upper_whisker_indices = get_indices(S, upper_whisker)
 8:         return V[upper_whisker_indices]
 9:
10:      q095 = quautile(S, 0.95)
11:      upper_5_indices = get_indices(S, q095)
12:      return V[upper_5_indices]
```

For a single cluster, two aspects of the log entropy score distribution were inspected by Algorithm 5. The first case was when the score distribution was similar to the distribution of Cluster 0, in which there existed outliers on the right side of the upper whisker. In this case, lines 6 to 8 in Algorithm 5 were applied to the cluster. Subsequently, the labels were generated as the vocabularies corresponding to the outlier data points on the right side. The other case was when the score was similar to the distribution of Cluster 1, in which no outliers existed beyond the upper whisker. Lines 10 to 12 from Algorithm 5 were applied to the cluster. Subsequently, the data points corresponding to the top five percent log entropy values were used as the cluster labels. The reason behind the development of the proposed heuristic was that in many cases applying a threshold to derive a top n percent labels could not best reflect the property of the cluster. Especially when the entropy scores followed a distribution similar to Cluster 0 in Table 9. In Cluster 0, the token “live” was the dominating vocabulary which had both the highest frequency value and average probability score. Thus, its entropy score was also much larger than the scores of other vocabularies. However, in Cluster 10 of Table 9, a single dominating token could not be identified. Rather, a combination of a few vocabularies could be used to describe the cluster. Hence, to distinguish the two situations, the identification of outlier data points was required to rule out whether dominating vocabularies existed.

In the present disclosure it is assumed that similar adjectives being in the same group, it is possible to summarize properties that will provide sentiment features towards the concepts of hotels. The clustering process consists of creating the adjective feature vectors and then applying the spherical k-means algorithm. It is necessary to determine a proper k-value, the number of clusters, before performing the full clustering task.

Each adjective needs to be associated with one feature vector in order to perform clustering using spherical k-means algorithm. In the present disclosure, the feature vectors were generated based on the most similar words output from the Word2Vec model. The spherical k-means algorithm requires each feature vector to be a unit vector as the angle between vectors is being compared. However, the ten similarity values for the most similar words given by the Word2Vec model cannot be used directly as a unit vector for each adjective. Additionally, in order to cluster the adjectives using a plurality of unique features, e.g., 2,222 unique features, each feature vector needs to be 2,222 dimensions with 2,212 zero values and ten similarity values in the positions corresponding to the ten most similar words, as described above with respect to the example provided. Therefore, the vectorization process includes constructing a 2,222 dimensional feature vector for each adjective based on the similarity values given by the ten most similar words, and then normalizing the feature vector to be a unit vector.

A cosine similarity method used in a spherical k-means algorithm was adopted for determining the similarity between words. When computing the similarity between two feature vectors, cosine similarity is preferable to the Euclidean distance because it measures the angle between two vectors which works better for grouping similar text. For example, suppose that the three words “awesome”, “excellent”, and “terrible”, and have the features vectors {“good”: 1, “bad”: 1}, {“good”: 6, “bad”: 6}, and {“good”: 0, “bad”: 1}. The Euclidean distance between “awesome” and “excellent” calculated by Equation 2 is $E_{ae}=7.07$ and the Euclidean distance between “awesome” and “terrible” $E_{ae}=1$. The words “awesome” and “excellent” seem to vary far apart because they have very different magnitudes of the features while “awesome” and “terrible” have relatively similar magnitudes. This implies that “awesome” and “terrible” are more related than “awesome” and “excellent”. On the other hand, the cosine similarity between “awesome” and “excellent” calculated by Equation 4 is $C_{ae}=1$ and the cosine similarity between “awesome” and “terrible” is $C_{ae}=0.70$, which suggests that “awesome” and “excellent” are more similar than “awesome” and “terrible”. While Euclidean distance measures the direct distance between two words, cosine similarity measures the distance between the directionality of the two vectors. Cosine values with angles in (0, 90°) always fit in the domain [0, 1], with cos(0°)=1 and cos(90°)=0. A smaller angle results in a value closer to 1, which implies that the two words are more similar.

According to the methodology of the present disclosure, the k-value has to be predetermined based on the characteristics of the dataset. Nevertheless, large unstructured datasets often need clustering in order to find the patterns in the data. It is usually undesirable and impractical to examine the dataset manually to find the best k-value for each case. To mitigate this, researcher developed several methods for determining an optimal k-value. One method is the Elbow method, which measures whether increasing the k-value improves the resulting clusters. The idea behind Elbow method is that adding more clusters will eventually not result in significantly better modeling of the dataset. More precisely, when clustering a dataset with k=1, 2, 3, . . . , the change in the resulting clusters when going from k=i to k=i+1 will have a large variance. However, as the k-value becomes larger, the variance for adding more clusters will eventually converge to 0. The Elbow method suggests that the k-value at the convergence point will be the appropriate number of clusters to be chosen. The two factors for determining how well the clusters model the dataset are between cluster variance, which is calculated through measuring the distance between clusters, and within-cluster variance which is calculated through measuring the distances between a cluster center and elements in the cluster. By calculating the ratio of between-cluster variance to the total variance or by calculating the mean of in-cluster variance, an “Elbow” value can be computed for the corresponding k-value. The latter method was used in the present disclosure.

Figure 9:
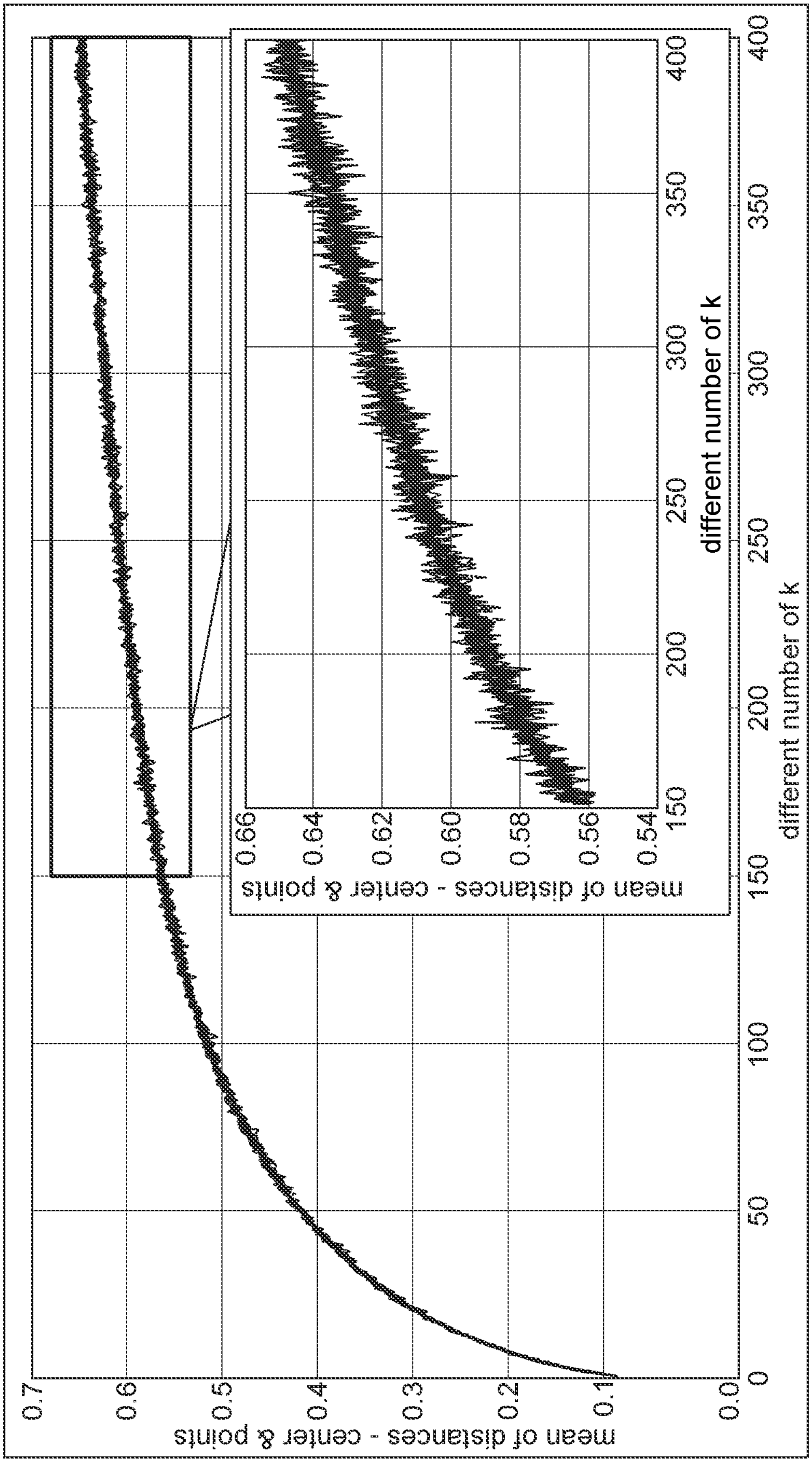
FIG. 9 is a graph of elbow values for 10 experiments with k=1, 2, . . . , 400.

The dataset was clustered using the different k-values in the range of [1, 400] and the mean of within-cluster variance was recorded and plotted. The standard deviation was calculated between the clusters for k=[n, n+20] for every multiple of 5 (k=[1, 21], k=[6, 26], and so on). A total of 77 such standard deviations were recorded and the middle k-value for the range with the smallest standard deviation was selected as the k-value for clustering. The range of the k-values was determined by trying different upper limits. Several trials with various ranges of k-values were executed and the results suggested that the "Elbow" value converged around 250-300. Therefore, the upper limit was extended to 400, which seemed to be a reasonable extension of the range for capturing marginal errors around this value. Finally, the experiment for k-value in the range [1, 400] was repeated 10 each to check the consistency of the k-value across different random initial centroids (FIG. 9 which is a graph of elbow values for 10 experiments with k=1, 2, . . . , 400). For datasets with low fuzziness, which means dataset with low ambiguity, it is likely to obtain consistent clusters; for datasets with high fuzziness, which means dataset with high ambiguity, the clusters might differ across different experiments. The consistency of the clustering was measured through repeated experiments to ensure that the output clusters were not simply results of lucky random initial values.

The k-values that converged from the 10 experiments with k in range [1, 400] were 375, 300, 265, 235, 220, 370, 380, 260, 195, and 295. A final converged k-value of 290 was chosen from applying the ceiling function to the average of the converged kvalues from the 10 experiments.

The feature vocabularies in each cluster carries two characteristics after clustering. First is that each of them carry a frequency as in how many times the same vocabulary present among the predicate vectors in the cluster. Second is that every time a vocabulary presents, there is a prediction probability from the LM associated with it. To rank the feature vocabularies, both of these characteristics should be taken into consideration. It is possible that a highly frequent vocabulary takes on average a very low probability, or a low frequent vocabulary carries a very high probability in its few occurrence. Considering only one side of both frequency and probability for ranking the information carriage can result in incorrect representation of the distribution. Thus, entropy which can incorporate both frequency (the sum) and the probability (the individual entropy) is selected, which can satisfy both conditions.

In real data based KG acquisition tasks, a universal evaluation method is not defined. Many approaches exploit partial manual evaluation to have MTurkers determine if the acquired KG instances are legitimate. The same difficulty applies to evaluation of the relations. In order to gain a good understanding on how prompt-based learning can have an effect on relation fusion, and whether prompt-based learning can help generating relation concepts, the evaluation is divided into two parts. First, in order to understand how prompt-based learning affects relation fusion, the clustering are evaluated through a clustering coefficient which can indicate how well the clusters are distributed. If prompting can help with the Pre make more consistent predictions, the clustering results should exhibit high coherence within each cluster and high separation between different clusters. Second, whether a label generated fits the theme of the cluster and whether the data points in the cluster are appropriate require some human intervention to evaluate. However, due to the various number of experiment groups and the large size of the dataset, only the group with the best feedback from the first part is considered for human coder to evaluate. The human coder evaluates on two aspects, first, whether the data points in the same cluster fit well with each other. Second, whether the computed labels is a good representation of the main theme of the cluster.

Figure 4:
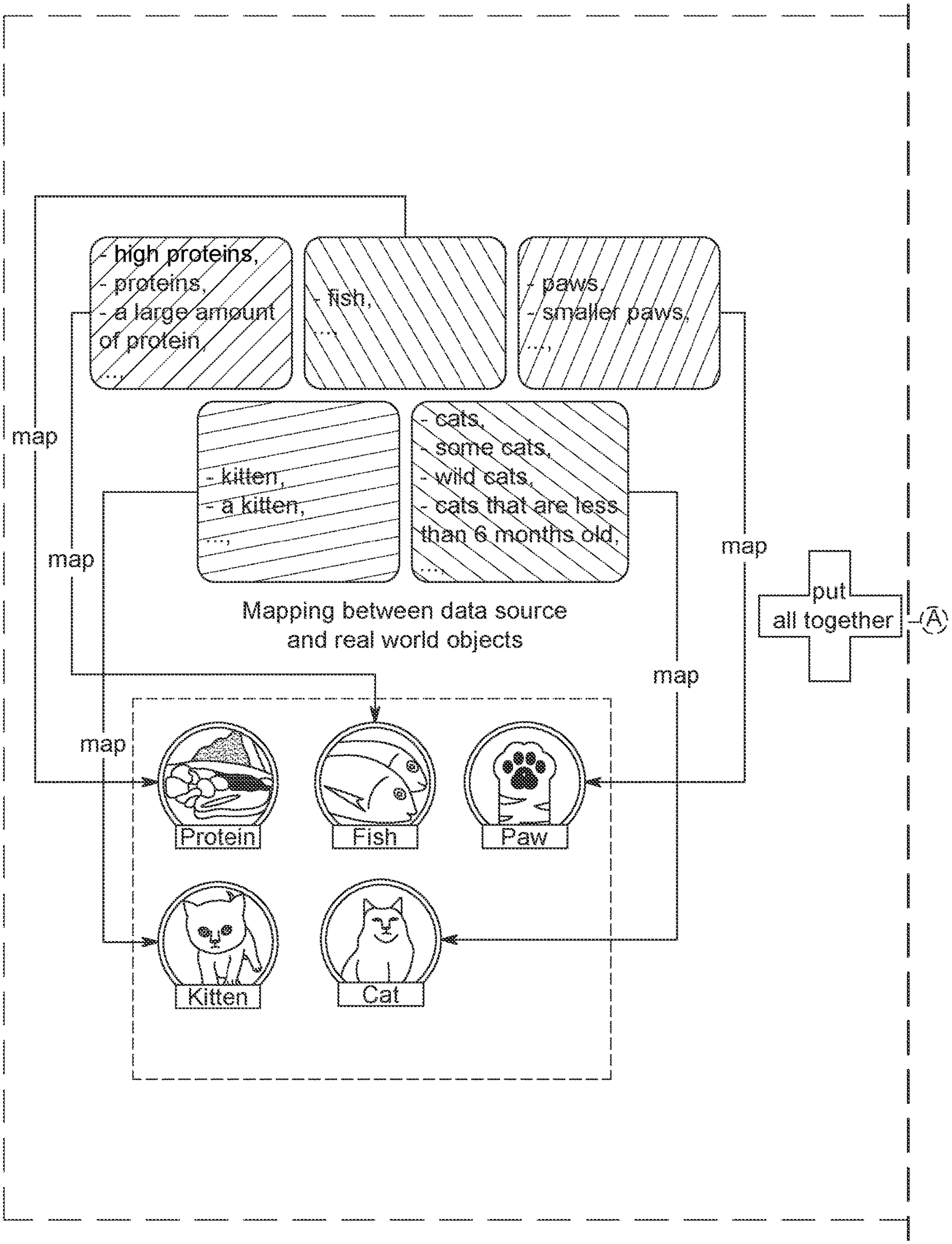
FIG. 4 is a schematic showing the output of the pre-processing block of FIG. 1*b* including the relations between the data source and real world objects is combined with the input data and the extracted unstructured raw triples and provided as input to a rule-based algorithm.
Figure 4:
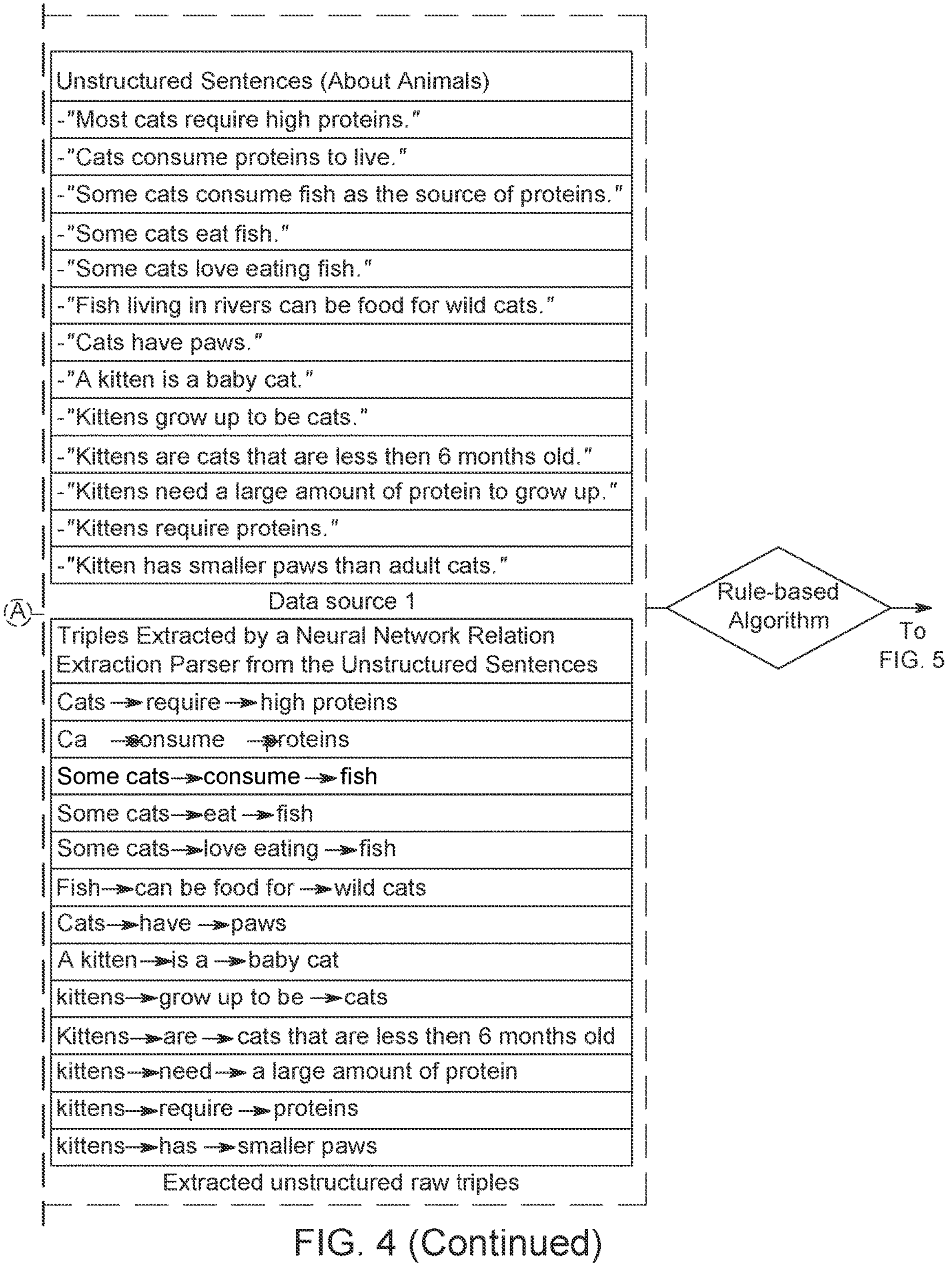
Figure 5:
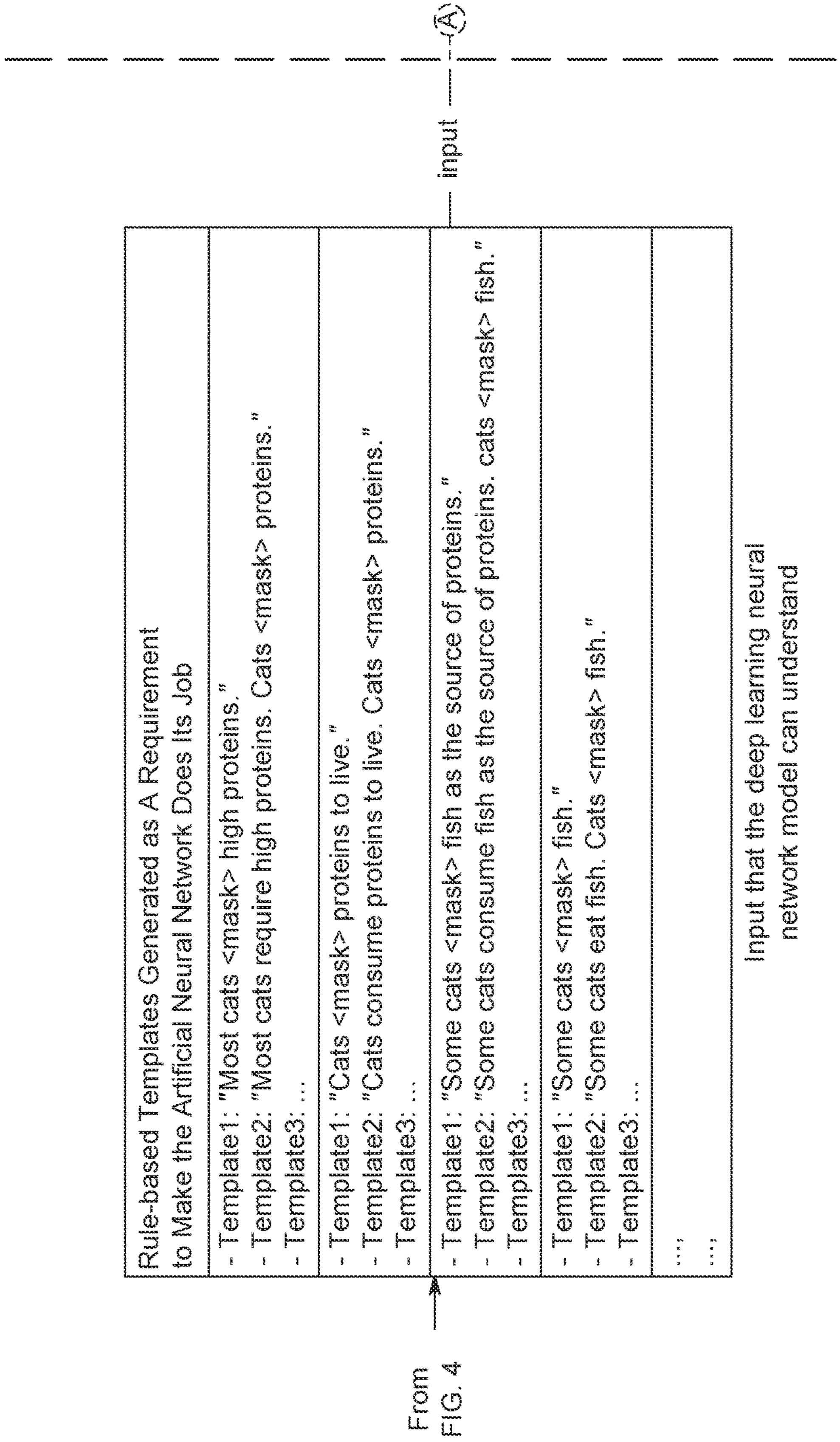
FIG. 5 is a schematic which shows how the output of FIG. 4 is handled which generates and output that a deep learning neural network model can understand, thus generating vector representation of the predicates for each raw triple obtained through prompting.
Figure 5:
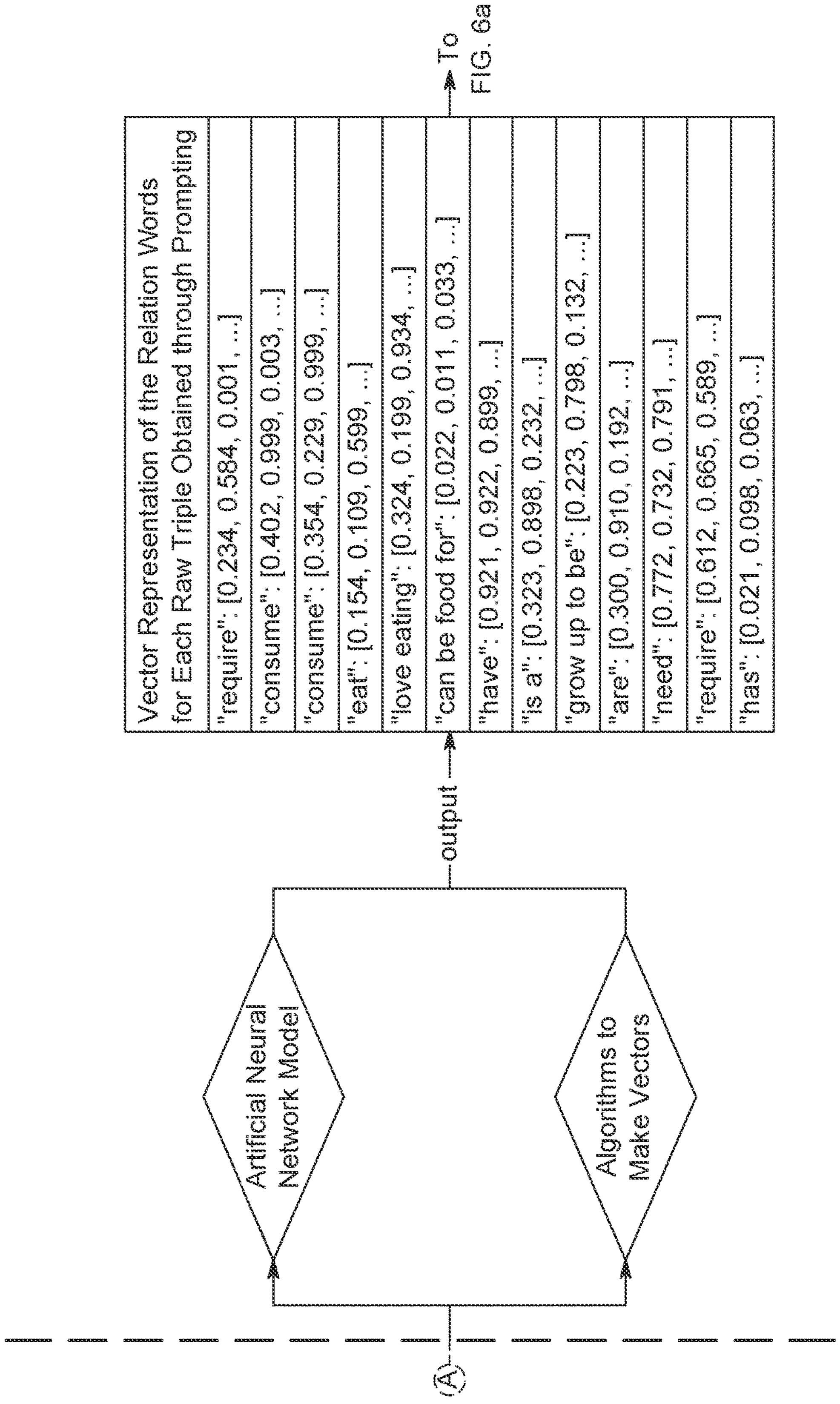
Figure 6A:
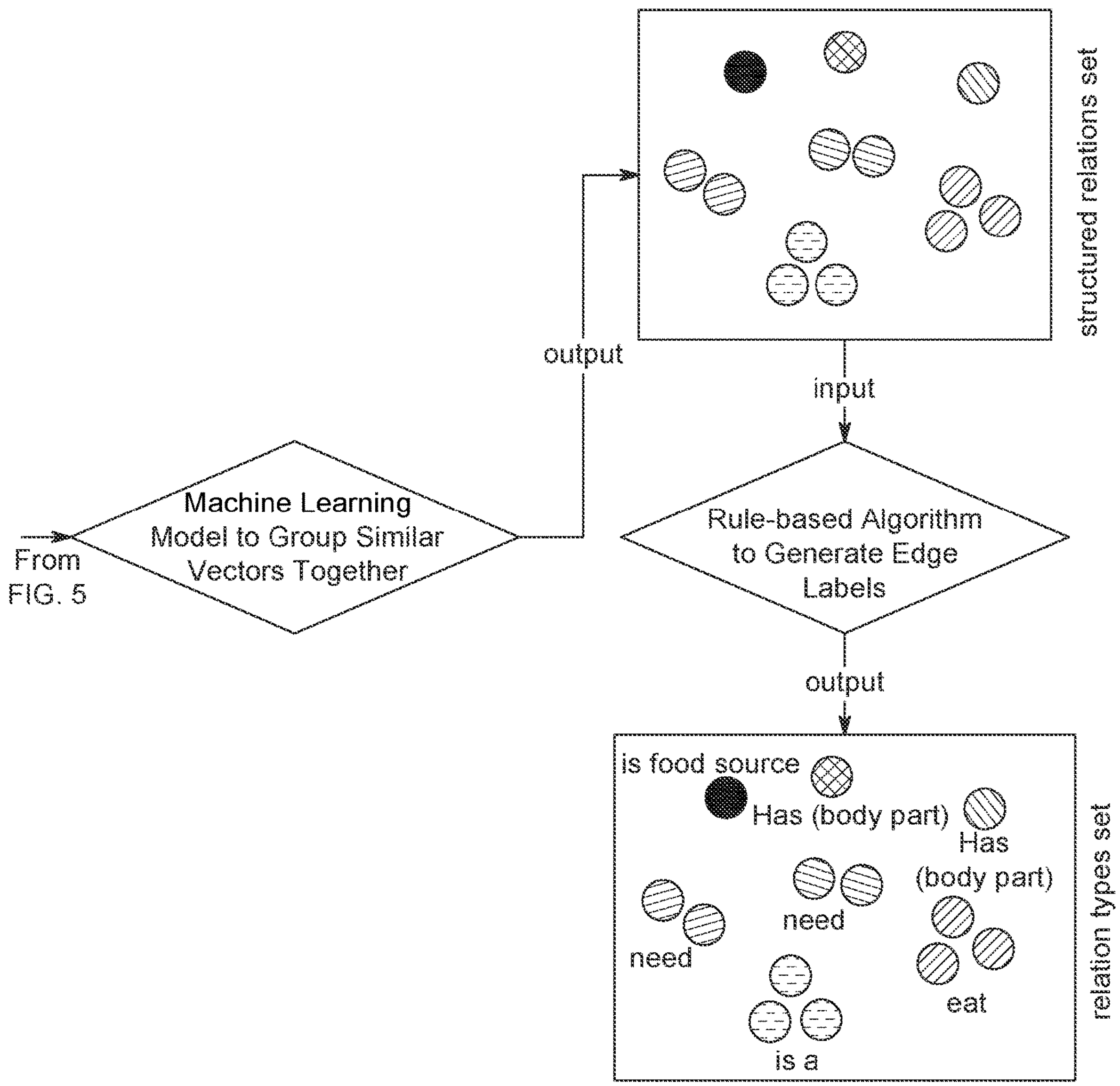
FIGS. 6*a*-6*b* are schematics showing how the output of FIG. 5 is provided to a machine learning model to group similar vectors which is also provided to a rule-based algorithm utilized to generate edge labels.
Figure 6B:
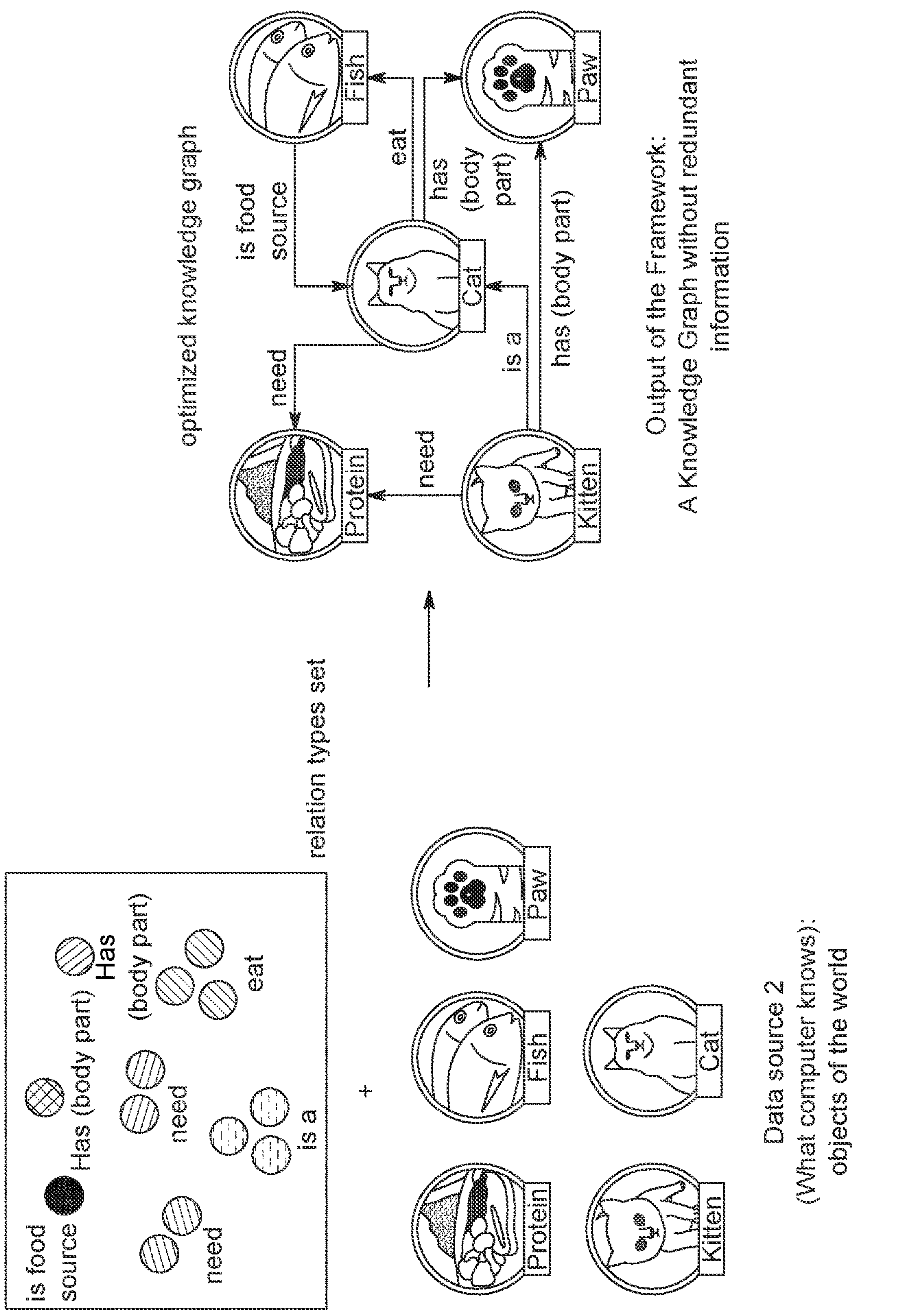

Referring to FIG. 4, the output of the pre-processing block discussed above including the relations between the data source and real world objects is combined with the input data and the extracted unstructured raw triples and provided as input to a rule-based algorithm. The output of this operation is shown in FIG. 5 which generates and output that a deep learning neural network model can understand. This output is then provided to an artificial neural network model and an algorithm designed to make vectors, as discussed above, to generate vector representation of the predicates for each raw triple obtained through prompting. Referring to FIGS. 6*a* and 6*b*, this output is provided to a machine learning model to group similar vectors which is also provided to a rule-based algorithm utilized to generate edge labels.

Figure 7:
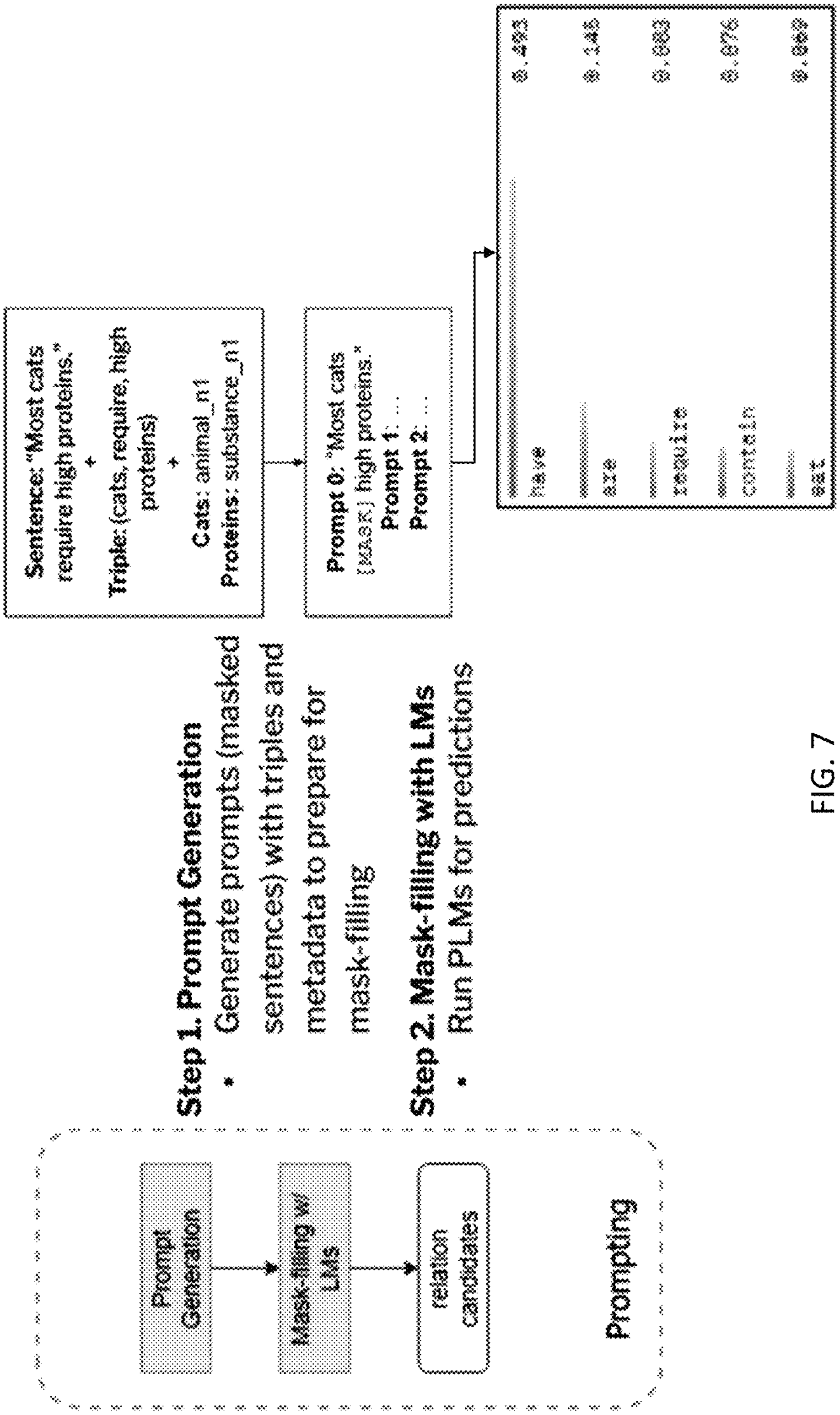
FIG. 7 is a schematic showing steps in prompting, according to the present disclosure.

Referring to FIG. 7, steps in prompting are depicted. The first step is prompt generation. As discussed above, prompts are masked sentences that are prepared with triples and metadata. Prompts are used for mask-filling, which is the second step requiring running LMs for predictions.

Figure 8:
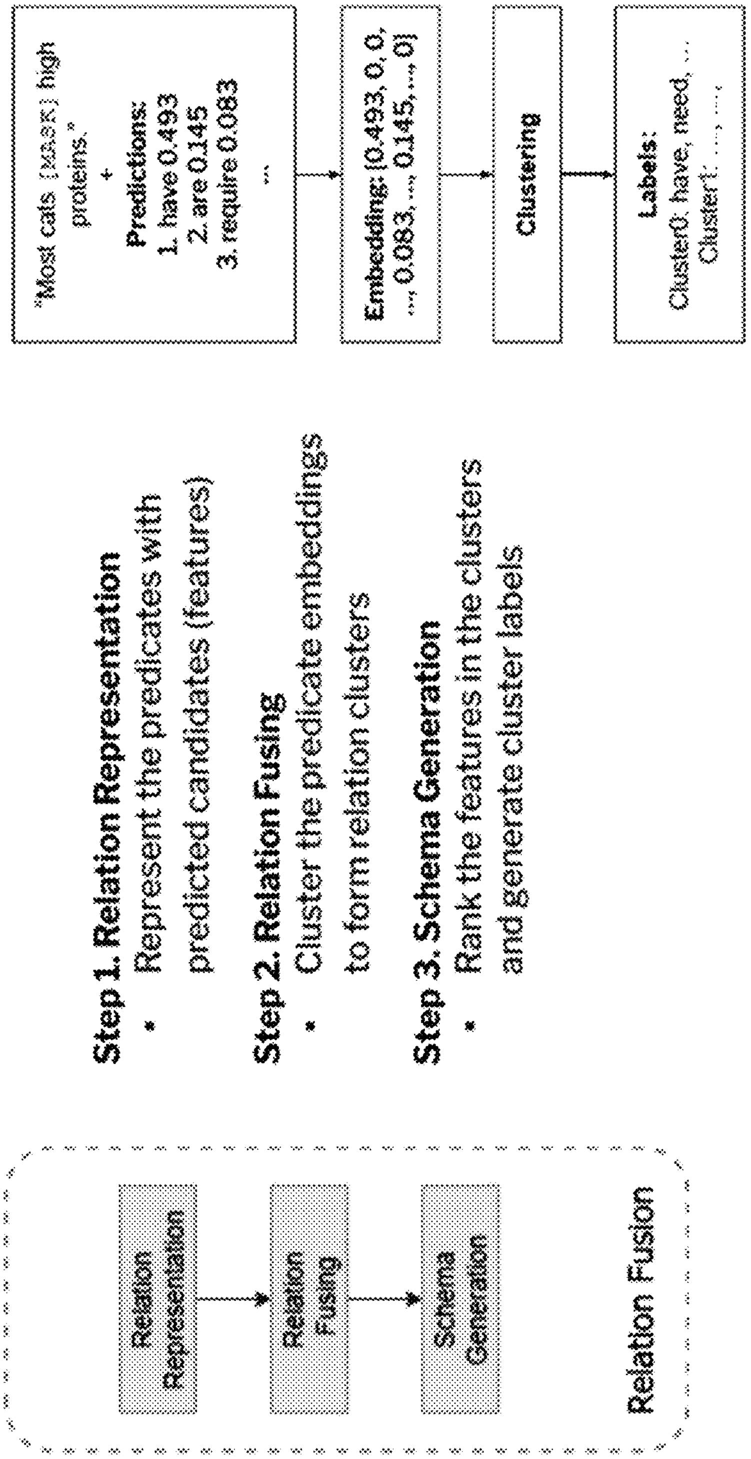
FIG. 8 is a schematic showing steps in relation fusion, according to the present disclosure.

Referring to FIG. 8 steps in relation fusion are shown. The first step is relation representation which begins with predicates with predicate candidates also referred to as features, followed by clustering the predicate embeddings to form relation cluster, and followed by ranking the features in the clusters and generating cluster labels.

According to one embodiment, Algorithm 6 below provides a complete roadmap for the operational steps of the present disclosure.

Algorithm 6—Complete Roadmap for Steps of the Present Disclosure, According to One Embodiment 1. Clean dataset
   a. Filter out non-English data
   b. Split data to sentence-by-sentence
2. Parse data using the Stanford Parser
   a. Parse sentence-by-sentence
   b. Record the parser output
3. Select amod pairs from the parser output
   a. For each word in the amod pairs
      i. Filter out those contain non-alphabetical characters
      ii. Change plural to singular
      iii. Record cleaned amod output
4. Train Word2Vec model in Gensim using the amod output
   a. Filter out words with frequency less than 100
   b. Use default for the rest parameters
   c. Save the model
5. Obtain most similar words to be features for each adjective
   a. Get default number (ten) of most similar words with similarity value
   b. Filter out the adjectives that are not in the model
6. Generate feature vector for each adjective
   a. Count the total number of unique features to be the dimension of vectors
   b. Construct feature vectors using the dimension and similarity value
      i. Positions correspond to most similar words are filled with similar values
      ii. Other positions are filled with zeros
   c. Normalize each feature vector to be unit vector
7. Use spherical k-means algorithm to cluster the feature vectors
   a. Use Elbow method to find the most appropriate k-value for the dataset
      i. Clustering using spherical k-means algorithm on the dataset with k=1, 2, 3, . . . , 400
      ii. Calculate and record the "Elbow" value, sum of in-cluster variance, for each k iii. Calculate the standard deviations to find the proper k-value 1. Calculate the standard deviation for k=[1, 20]
2. Calculate the standard deviation for k=[6, 26]
3. Increase the step size by 5 every time
4. Record the 77 calculated standard deviations
5. Take the smallest standard deviation and the range for kvalue
6. The middle k-value in the range is the appropriate k-value b. Repeat the Elbow method for finding k-value ten times i. Take the average result of the ten experiments to be the k-value ii. Record the output clusters c. Use the final k-value determined from Elbow method for clustering with spherical k-means algorithm 8. Map the feature vectors back to the corresponding adjectives a. Obtain output clusters with the adjectives to be the final result 9. Have annotators annotate the resulting clusters 10. Repeat the experiment with the final k-value 100 times a. Record output clusters 11. Calculate the split value compared to the final result a. Split value between final result and ten experiments with different k-value i. Calculate the split value for each cluster in the final result compared to every output obtained in step 7.b.

b. Split value between final result and 100 experiments with identical k-value i. Calculate the split value for each cluster in the final result compared to every output obtained in step 10.

ii. Calculate the average split value across and standard deviation of the split values across the 100 experiments for each cluster.

Additional disclosure including a complete listing of software code residing on non-transient memory and executed by one or more processors can be found in Appendix-A attached hereto which is incorporated by reference in its entirety into the present disclosure.

Those having ordinary skill in the art will recognize that numerous modifications can be made to the specific implementations described above. The implementations should not be limited to the particular limitations described. Other implementations may be possible.

The invention claimed is:

1. A method of generating knowledge graphs, comprising:

receiving a first input dataset representing unstructured sentences, wherein the unstructured sentences include unstructured triples, wherein each triple includes a head entity, a predicate, and a tail entity;

receiving a second input dataset representing classification of head and tail entities;

for each unstructured sentence received from the first input dataset:

applying a toolkit to thereby identify dependency between each word of said each unstructured sentence and one or more words in said each unstructured sentence, wherein the toolkit provides part of speech tags for each word in said each unstructured sentence;

annotating said each unstructured sentence by identifying the corresponding head entity, tail entity, and predicate; and pre-processing the first and the second input datasets to thereby generate a first structured database including a plurality of rows wherein each row includes a plurality of parameters, number of rows in the first structured database is based on number of unstructured sentences obtained from the first input dataset which have corresponding head and tail entities in the second input dataset based on the identified corresponding head and tail entities, wherein the first structured database includes masked sentences, whereby each identified predicate is substituted by a mask;

generating prompts for the masks associated with each row in the first structured database to thereby generate a second structured database;

communicating with a language model (LM) the second structured database to thereby generate and process candidate predicates associated with each prompt for each sentence from the second structured database, each candidate predicate accompanied with an associated probability number of accuracy;

numerically representing the predicate candidates based on the associated probability numbers;

clustering the numerical representation of the predicate candidates;

fusing relations of the predicate candidates based on the clustering; and generating a knowledge graph based on repetition of predicate candidates.

2. The method of claim 1, wherein the step of annotating includes:

processing each sentence of the first input dataset by a first computing model to thereby identify the associated triple.

3. The method of claim 1, wherein the first structured database includes:

the identified head entity, tail entity, and predicate, the associated sentence from the first input dataset, position of each of the identified head entity, tail entity, and predicate in said sentence, part of speech tags for said identified head entity, tail entity, and predicate, and the associated masked sentence.

4. The method of claim 3, wherein the second structured database includes:

two prompting functions $f_1$ and $f_2$ which map an associated sentence x to prompts $p_1$ and $p_2$ respectively, defined as:

$$f_1(x,h,t)\rightarrow p_1{:}x\cdot h[\text{MASK}]t,$$

$$f_2(x,h,t)\rightarrow p_2{:}h\ be\ c_h\cdot t\ be\ c_t{:}x'.$$

5. The method of claim 1, wherein the first computing model is Stanford Open Information Extraction (OpenIE).

6. The method of claim 1, wherein the first input dataset is GenericsKB.

7. The method of claim 1, wherein the first input dataset is Aristo Tuble KB.

8. The method of claim 1, wherein the toolkit is Stanford Core NLP toolkit.

9. The method of claim 8, wherein the toolkit includes a dependency parser and a port of speech analyzer.

10. The method of claim 1, wherein the LM is RoBERTa language model.

11. The method of claim 1, wherein n predicate candidates provided by the LM is considered for each sentence from the second structured database.

12. The method of claim 11, wherein n is 10.

13. The method of claim 1, wherein the clustering is based on K-Means type clustering.

14. The method of claim 13, wherein the K-Means is based on:

letting $X=\{x_1, x_2, x_3, \ldots x_n\}$ be a set of data points, and $V=\{\mu_1, \mu_2, \mu_3, \ldots \mu_k\}$ be a set of centroids:

a. randomly selecting k cluster centroids;

b. calculating Euclidean distance between each data point an centroids;

c. assigning data points to the nearest cluster centroid;

d. recalculating centroids;

e. comparing new centroids to old centroids:

i. If same, then done;

ii. If not same then go back to step b.

15. The method of claim 14, wherein the step of calculating Euclidean distance is based on:

$$\|a-b\|^2.$$

16. The method of claim 14, wherein the step of recalculating centroids is based on:

$$\mu_j = \frac{1}{m_j}\sum\nolimits_{j=1}^{m_j} X_j.$$

* * * * *